US012035128B2

(12) United States Patent
Osako et al.

(10) Patent No.: US 12,035,128 B2
(45) Date of Patent: Jul. 9, 2024

(54) SIGNAL PROCESSING DEVICE AND SIGNAL PROCESSING METHOD

(71) Applicant: SONY GROUP CORPORATION, Tokyo (JP)

(72) Inventors: Keiichi Osako, Tokyo (JP); Yuhki Mitsufuji, Tokyo (JP); Masafumi Takahashi, Tokyo (JP); Yukara Ikemiya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 103 days.

(21) Appl. No.: 17/782,095

(22) PCT Filed: Dec. 2, 2020

(86) PCT No.: PCT/JP2020/044855
§ 371 (c)(1),
(2) Date: Jun. 2, 2022

(87) PCT Pub. No.: WO2021/117576
PCT Pub. Date: Jun. 17, 2021

(65) Prior Publication Data

US 2023/0011357 A1 Jan. 12, 2023

(30) Foreign Application Priority Data

Dec. 13, 2019 (JP) ................................. 2019-224997

(51) Int. Cl.
*H04S 7/00* (2006.01)
*G10K 15/08* (2006.01)
*H04R 3/12* (2006.01)

(52) U.S. Cl.
CPC .............. *H04S 7/305* (2013.01); *G10K 15/08* (2013.01); *H04R 3/12* (2013.01); *H04S 7/303* (2013.01)

(58) Field of Classification Search
CPC .. H04R 3/00; H04R 3/005; H04R 3/12; H04S 7/00; H04S 7/30; H04S 7/303;
(Continued)

(56) References Cited

U.S. PATENT DOCUMENTS 5,796,843 A * 8/1998 Inanaga .................. H04S 7/304 381/17
6,111,962 A * 8/2000 Akio ...................... G10K 15/12 381/104
(Continued)

FOREIGN PATENT DOCUMENTS

CN 103907151 A 7/2014
CN 111164673 A 5/2020
(Continued)

OTHER PUBLICATIONS

International Search Report and Written Opinion of PCT Application No. PCT/JP2020/044855, issued on Feb. 16, 2021, 10 pages of ISRWO.

*Primary Examiner* — Thang V Tran
(74) *Attorney, Agent, or Firm* — CHIP LAW GROUP

(57) ABSTRACT

Provided is a signal processing device including: a reverberation sound signal generation unit that generates a reverberation sound signal according to a sound source position of a virtual sound source and a distance to a reference point; and a drive signal generation unit that generates a drive signal for a speaker array by a wavefront synthesis filter, in which the drive signal generation unit generates the drive signal on the basis of a signal obtained by performing wavefront synthesis filtering processing on a signal obtained by convolving the reverberation sound signal with a signal of the virtual sound source and/or a signal obtained by performing wavefront synthesis filtering processing on the
(Continued)

reverberation sound signal to make the reverberation sound signal into a virtual sound source.

11 Claims, 17 Drawing Sheets

(58) Field of Classification Search
CPC ........... H04S 7/305; H04S 7/306; H04S 7/40; G10K 15/08; G10K 15/10; G10K 15/12
See application file for complete search history.

(56) References Cited

U.S. PATENT DOCUMENTS

| | | | | |
|---|---|---|---|---|
| 7,684,578 | B2 * | 3/2010 | Roeder | H04S 3/002 381/310 |
| 8,094,827 | B2 * | 1/2012 | Baba | H04S 7/305 381/86 |
| 2005/0117753 | A1 * | 6/2005 | Miura | H04S 3/008 381/310 |
| 2007/0253564 | A1 * | 11/2007 | Katayama | H04S 3/008 84/630 |
| 2008/0089522 | A1 | 4/2008 | Baba et al. | |
| 2014/0185817 | A1 | 7/2014 | Rodigast | |
| 2014/0211945 | A1 | 7/2014 | Norimatsu et al. | |
| 2017/0223478 | A1 * | 8/2017 | Jot | H04S 7/306 |
| 2020/0358415 | A1 * | 11/2020 | Aoyama | H04S 7/302 |

FOREIGN PATENT DOCUMENTS

| | | | |
|---|---|---|---|
| EP | 2770754 | A1 | 8/2014 |
| JP | 2009-071406 | A | 4/2009 |
| JP | 2014-529251 | A | 10/2014 |
| JP | 2019-165845 | A | 10/2019 |
| WO | 2006/009028 | A1 | 1/2006 |
| WO | 2013/034444 | A1 | 3/2013 |
| WO | 2013/057948 | A1 | 4/2013 |
| WO | 2019/078035 | A1 | 4/2019 |

* cited by examiner

SIGNAL PROCESSING DEVICE AND SIGNAL PROCESSING METHOD

CROSS REFERENCE TO RELATED APPLICATIONS

This application is a U.S. National Phase of International Patent Application No. PCT/JP2020/044855 filed on Dec. 2, 2020, which claims priority benefit of Japanese Patent Application No. JP 2019-224997 filed in the Japan Patent Office on Dec. 13, 2019. Each of the above-referenced applications is hereby incorporated herein by reference in its entirety.

TECHNICAL FIELD

The present disclosure relates to a signal processing device, a signal processing method, and a program.

BACKGROUND ART

Sound heard in a general environment such as a room is reverberated by a sound wave generated from a sound source being repeatedly reflected on a floor, a ceiling, or a wall. Since the frequency characteristics and the duration of the sound change due to this reverberation, a listener can perceive a sense of distance to the sound and a sense of reverberation by these changes. A technique for adding such reverberation is described in Patent Document 1 below.

CITATION LIST

Patent Document

Patent Document 1: WO 2013/057948 A

SUMMARY OF THE INVENTION

Problems to be Solved by the Invention

However, in the technique described in Patent Document 1, only a delay simulating reverberation is operated as a control target, and thus, it is insufficient to control a sense of reverberation caused by sound reflection or sound duration.

An object of the present disclosure is to provide a signal processing device, a signal processing method, and a program capable of adding appropriate reverberation to a signal of a virtual sound source, for example.

Solutions to Problems

The present disclosure provides, for example, a signal processing device including:

a reverberation sound signal generation unit that generates a reverberation sound signal according to a sound source position of a virtual sound source and a distance to a reference point; and a drive signal generation unit that generates a drive signal for a speaker array by a wavefront synthesis filter, in which the drive signal generation unit generates the drive signal on the basis of a signal obtained by performing wavefront synthesis filtering processing on a signal obtained by convolving the reverberation sound signal with a signal of the virtual sound source and/or a signal obtained by performing wavefront synthesis filtering processing on the reverberation sound signal to make the reverberation sound signal into a virtual sound source.

The present disclosure provides, for example, a signal processing method including:

generating, by a reverberation sound signal generation unit, a reverberation sound signal according to a sound source position of a virtual sound source and a distance to a reference point; and generating, by a drive signal generation unit, a drive signal for a speaker array by a wavefront synthesis filter, in which the drive signal generation unit generates the drive signal on the basis of a signal obtained by performing wavefront synthesis filtering processing on a signal obtained by convolving the reverberation sound signal with a signal of the virtual sound source and/or a signal obtained by performing wavefront synthesis filtering processing on the reverberation sound signal to make the reverberation sound signal into a virtual sound source.

The present disclosure provides, for example, a program for causing a computer to execute a signal processing method including:

generating, by a reverberation sound signal generation unit, a reverberation sound signal according to a sound source position of a virtual sound source and a distance to a reference point; and generating, by a drive signal generation unit, a drive signal for a speaker array by a wavefront synthesis filter, in which the drive signal generation unit generates the drive signal on the basis of a signal obtained by performing wavefront synthesis filtering processing on a signal obtained by convolving the reverberation sound signal with a signal of the virtual sound source and/or a signal obtained by performing wavefront synthesis filtering processing on the reverberation sound signal to make the reverberation sound signal into a virtual sound source.

MODE FOR CARRYING OUT THE INVENTION

Hereinafter, embodiments and the like of the present disclosure will be described with reference to the drawings. Note that the description will be made in the following order.

<Problems to be Considered in the Present Disclosure>
<First Embodiment>
<Second Embodiment>
<Third Embodiment>
<Modification>

The embodiments and the like to be described below are preferred specific examples of the present disclosure, and the contents of the present disclosure are not limited to these embodiments and the like.

Problems to be Considered in the Present Disclosure

First, in order to facilitate understanding of the present disclosure, the background of the present disclosure and problems to be considered in the present disclosure will be described.

In recent years, high-resolution audio recorded at a high bit rate and high sampling rate and virtual surround audio reproduced by headphones have become widespread. These provide new values to conventional digital audio. Meanwhile, research and development of surround audio reproduced by a multichannel speaker are also in progress, and efforts have started to implement a real listening experience by increasing resolution not only in a time direction but also in a spatial direction. There has been proposed a technique of reproducing a wavefront propagating in space with spatially high resolution by using a much larger number of speakers than conventional 2 to 5.1 channel (ch) surround systems to faithfully reproduce the original wavefront. Such a technique is generally called "wavefront synthesis", and various research and development are being conducted in academic and industrial fields.

Figure 1:
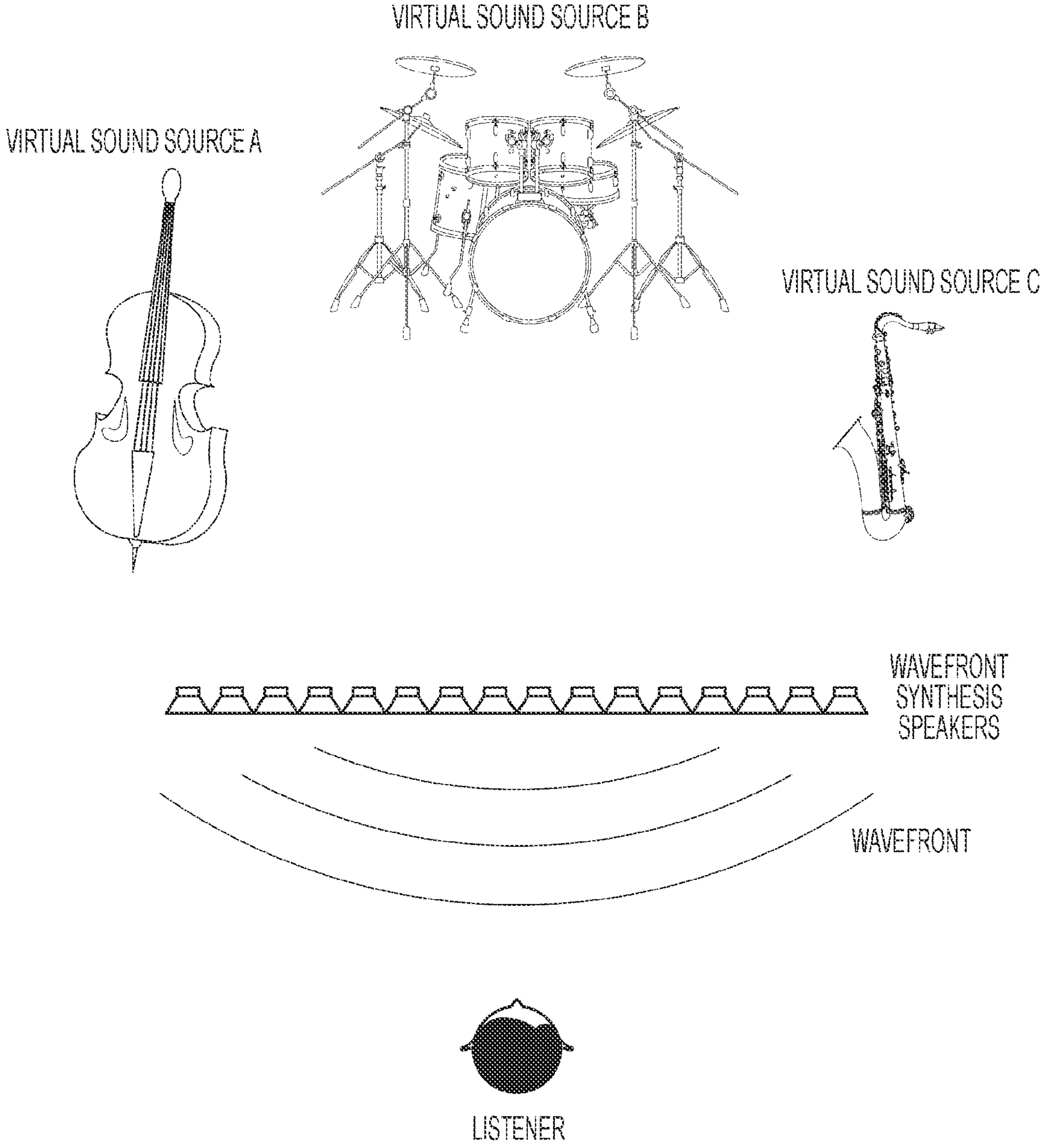
FIG. 1 is a diagram for describing an outline of a wavefront synthesis technique.

FIG. 1 is a diagram for describing an outline of wavefront synthesis. As illustrated in FIG. 1, wavefront synthesis is a system in which musical instruments as virtual sound sources (object sound sources) are arranged at any positions in space, and a wavefront of sound generated from the virtual sound sources is reproduced from a plurality of speakers. Physically reproducing the wavefront generated from the musical instruments makes it possible to provide a sound environment as if there were real musical instruments on the spot. Furthermore, each virtual sound source can be moved or arranged nearer to a listener than the speaker array that reproduces the sound for implementing the wavefront synthesis, which makes it possible to implement music reproduction with an unprecedented degree of freedom. Note that, although the musical instruments are illustrated in FIG. 1, as described above, these illustrate the types of the virtual sound sources in an easy-to-understand manner, and do not mean that actual musical instruments are arranged. In addition, the type of each virtual sound source is not limited to a musical instrument, and may be a voice of an animal or an environmental sound.

Meanwhile, sound heard in a general environment is reverberated by a sound wave generated from a sound source being repeatedly reflected on a floor, a ceiling, or a wall. Since the frequency characteristics and the duration of the sound change due to this reverberation, a listener can perceive a sense of distance to the sound and a sense of reverberation by these changes. However, in the wavefront synthesis, influences of reflection or the like are not physically reproduced. Therefore, even if a virtual sound source is arranged to accurately reproduce a wavefront, it may be difficult for a listener to perceive the sense of distance to the sound source and the sense of reverberation. Therefore, even in the wavefront synthesis, it is considered that appropriately adding reverberation makes it possible to improve a realistic feeling caused by a sound field to be reproduced. In view of the above point, the embodiments of the present disclosure will be described in detail.

First Embodiment

[Outline]

Figure 2:
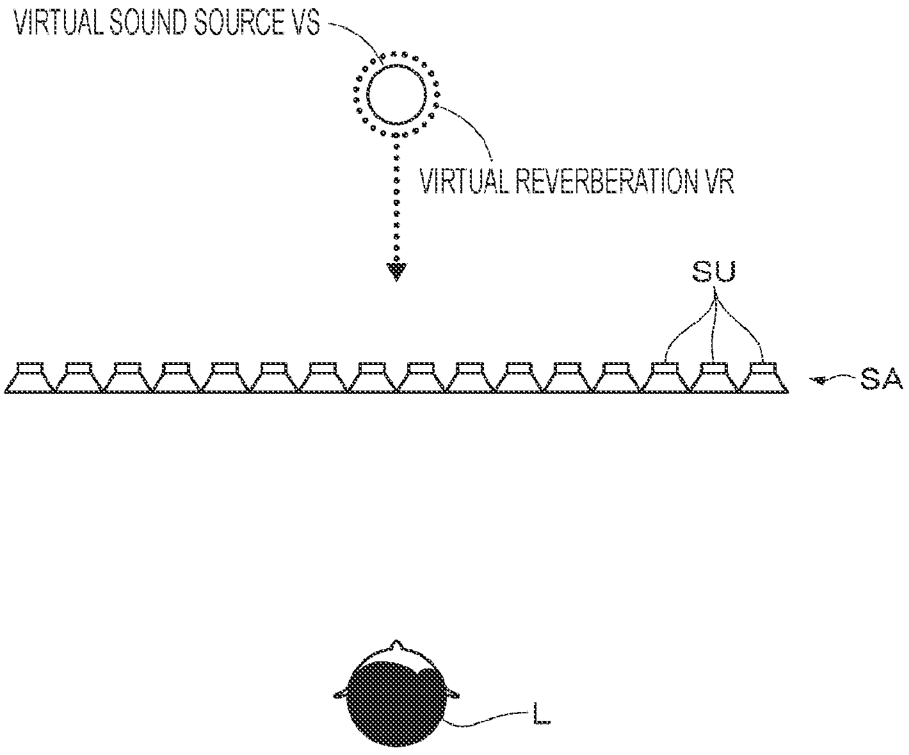
FIG. 2 is a diagram for describing an outline of a first embodiment.

The present disclosure is a technique in which reverberation is added in a system to which wavefront synthesis is applied (hereinafter, such a system will be appropriately abbreviated as a "wavefront synthesis system"). FIG. 2 is a diagram for describing an outline of a first embodiment. As illustrated in FIG. 2, a wavefront of sound generated from a predetermined virtual sound source VS is reproduced from a speaker array SA including a plurality of speaker units SU. As a result, a listener L listens to the sound of the virtual sound source VS, at which a sound source such as a musical instrument is localized. The position of the virtual sound source VS may change. The first embodiment is an embodiment in which virtual reverberation VR is added to the virtual sound source VS itself.

Here, a specific example of adding reverberation to a virtual sound source itself in the wavefront synthesis system will be described. First, the property of reverberation will be described in terms of the distance between a sound source and a sound reception point.

Figures 3A, 3B:
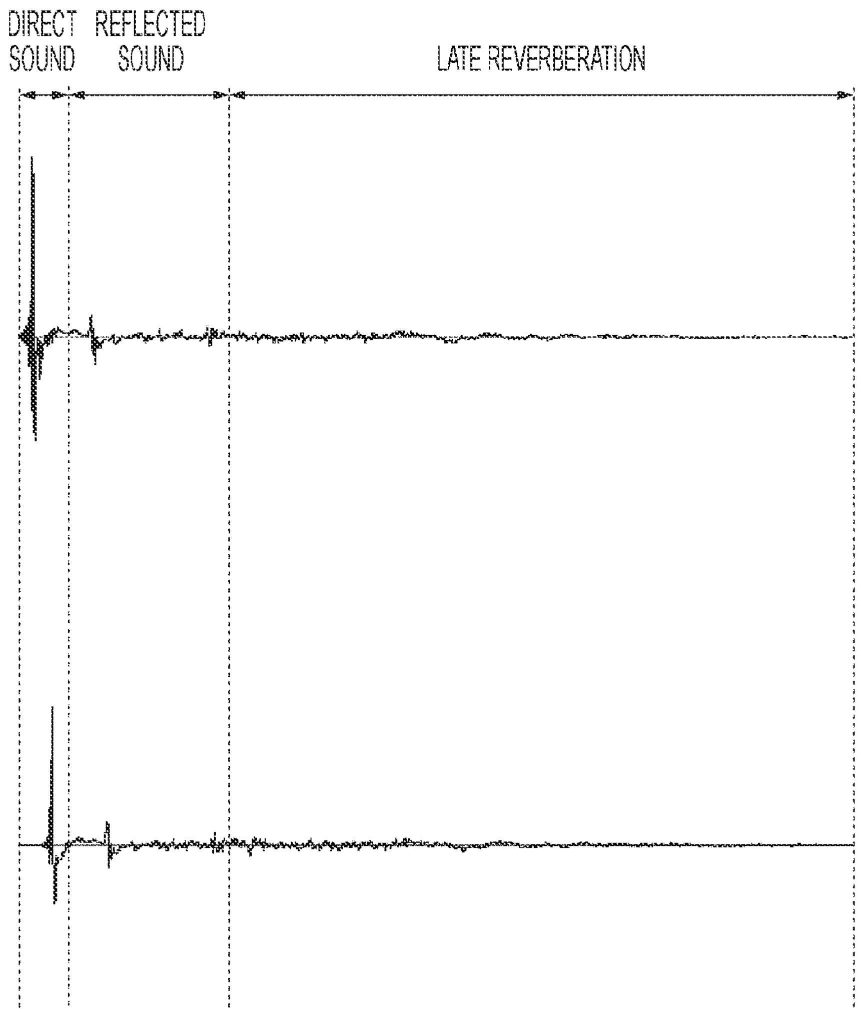
FIGS. 3A and 3B are diagrams each illustrating an example of a reverberation waveform measured by use of a microphone.

FIGS. 3A and 3B illustrate an example of a reverberation (impulse response) waveform measured by use of a microphone. FIG. 3A illustrates an example of the reverberation waveform in a case where the distance between a predetermined sound source and a sound reception point (installation position of the microphone) is short, and FIG. 3B illustrates an example of the reverberation waveform in a case where the distance between the predetermined sound source and the sound reception point is long. The reverberation can be divided into three parts: a direct sound, a reflected sound (also referred to as an initial reflected sound), and late reverberation (also referred to as a late reverberation sound). Note that the reflected sound and the late reverberation are distinguished according to the time taken to reach the sound reception point with reference to the straight sound, the presence or absence of perceptibility of a direction (for example, it is possible to perceive the direction of arrival of the reflected sound, whereas it is not possible to perceive the direction of arrival of the late reverberation), or the like.

When the two direct sounds are compared, the amplitude value of the direct sound illustrated in FIG. 3A is larger than the amplitude value of the direct sound illustrated in FIG. 3B. This indicates that the distance from the position of the sound source to the sound reception point is different, and the sound pressure decreases due to attenuation in distance as the distance is longer. In addition, each of the reflected sound and the late reverberation is a sound in which sounds radiated at all angles are reflected on a wall and collected, and a large difference in amplitude due to a difference in distance from the sound source to the sound reception point is not observed. Therefore, it can be considered that the energy ratio of the "direct sound" to the "reflected sound and late reverberation" changes according to the distance. Furthermore, in a case where the sound pressure of the direct sound is normalized with the maximum amplitude, it can be said that the longer is the distance to the sound source, the relatively higher is the ratio of the late reverberation, and accordingly, the longer is the time for which the late reverberation is heard. The reverberation control according to the distance is a technical basis in the present embodiment.

Figure 4:
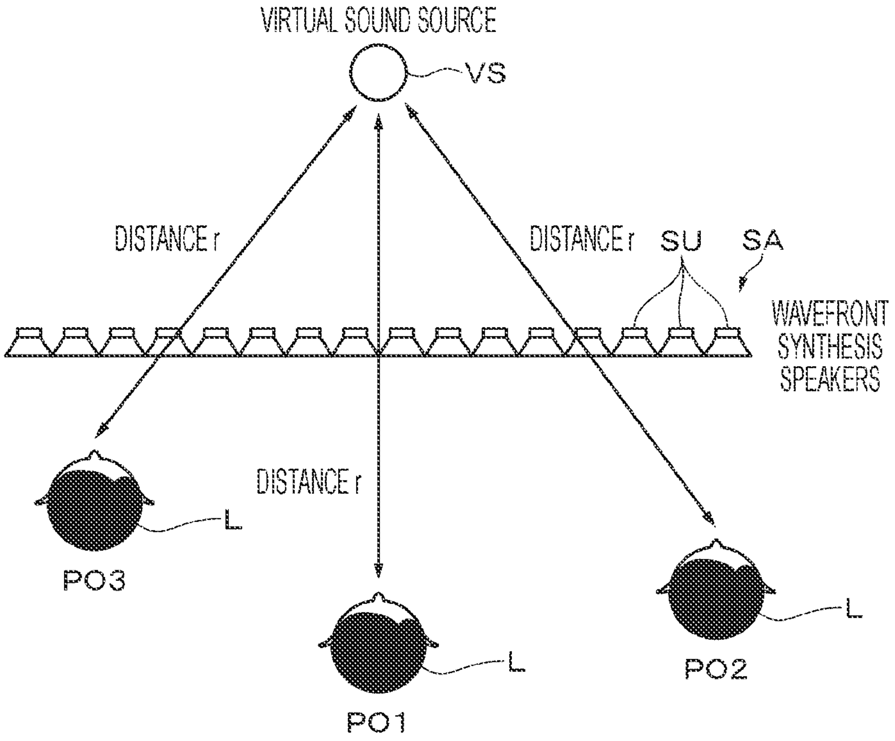
FIG. 4 is a diagram illustrating a reproduction system according to the first embodiment.

FIG. 4 is a diagram illustrating a reproduction system according to the first embodiment, specifically, a wavefront synthesis system in which the virtual sound source VS is arranged in space and one listener L listens to the sound of the virtual sound source VS in front of the speaker array SA. The distance (shortest distance) between the virtual sound source VS and the reference point is set as a distance r. A reference point according to the present embodiment is the sound reception position with respect to the sound source position of the virtual sound source VS, that is, the position of the listener L. The distance r is acquired by use of a distance measuring camera (depth camera), a time of flight (ToF) sensor, light detection and ranging (LiDAR), a beacon, or the like, which is capable of measuring the distance to the listener L. Note that the position of the listener L can change among positions PO1, PO2, and PO3 as illustrated in FIG. 4. A new distance r is acquired according to the change in the position of the listener L. The distance r also changes when the position of the virtual sound source VS changes.

The level and length of reverberation are adjusted according to the distance r, so that a reverberation sound signal is generated. The reverberation sound signal is convolved with a signal of the virtual sound source VS and then processed by a wavefront synthesis filter to generate a drive signal, and the drive signal is reproduced from the speaker array SA, so that the listener L can listen to the sound to which the reverberation is added. As the reverberation to be convolved with the virtual sound source VS, reverberation measured in advance in a concert hall or the like, or reverberation created by use of a simulation algorithm such as a method of mirror images can be used.

Figure 5:
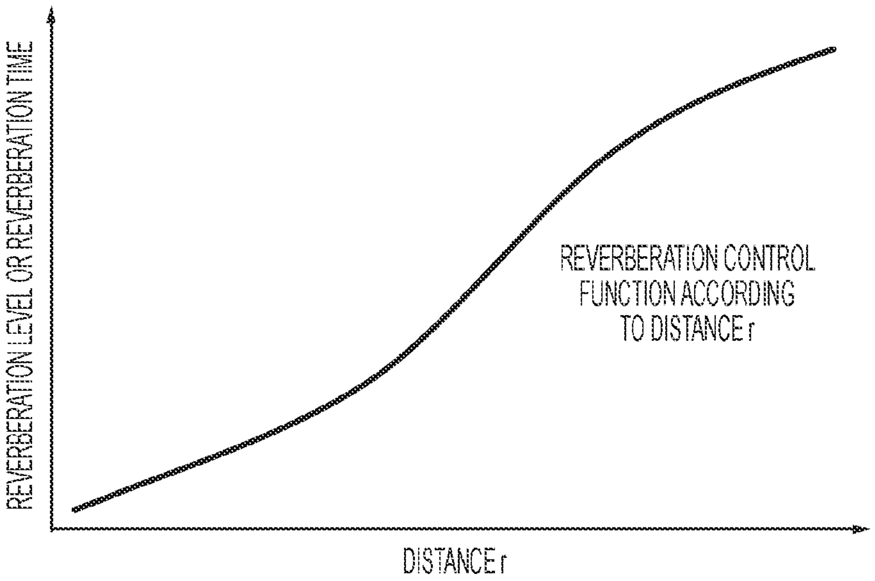
FIG. 5 is a diagram illustrating an example of a reverberation control function.

The reverberation added according to the distance r is determined according to, for example, a reverberation control function. FIG. 5 illustrates an example of such a reverberation control function. In FIG. 5, the horizontal axis indicates the distance r, and the vertical axis indicates the level of the reverberation or the reverberation time. Applying the reverberation control function illustrated in FIG. 5 makes it possible to perform control such that at least one of the reverberation level or reverberation time is longer as the distance increases. Holding the reverberation control function or acquiring the reverberation control function from an external device makes it possible to follow and cope with the distance change accompanying movement of the virtual sound source VS or the listener L. That is, measuring the distance r in advance makes it possible to automatically calculate the reverberation reproduced by the wavefront synthesis system. Furthermore, in addition to the system that performs wavefront synthesis offline, the distance r may be measured in real time, and reverberation according to distance change can be calculated and reproduced in real time.

Note that the reverberation control function described above can be adjusted by a user. For example, the curvature of the reverberation control function may be adjusted by the user. A configuration may be adopted in which the user can freely change the curvature of the reverberation control function by displaying the reverberation control function on editing software for wavefront synthesis and performing a drag and drop operation or the like with a mouse on the reverberation control function.

<Configuration Example of Signal Processing Device>

Figure 6:
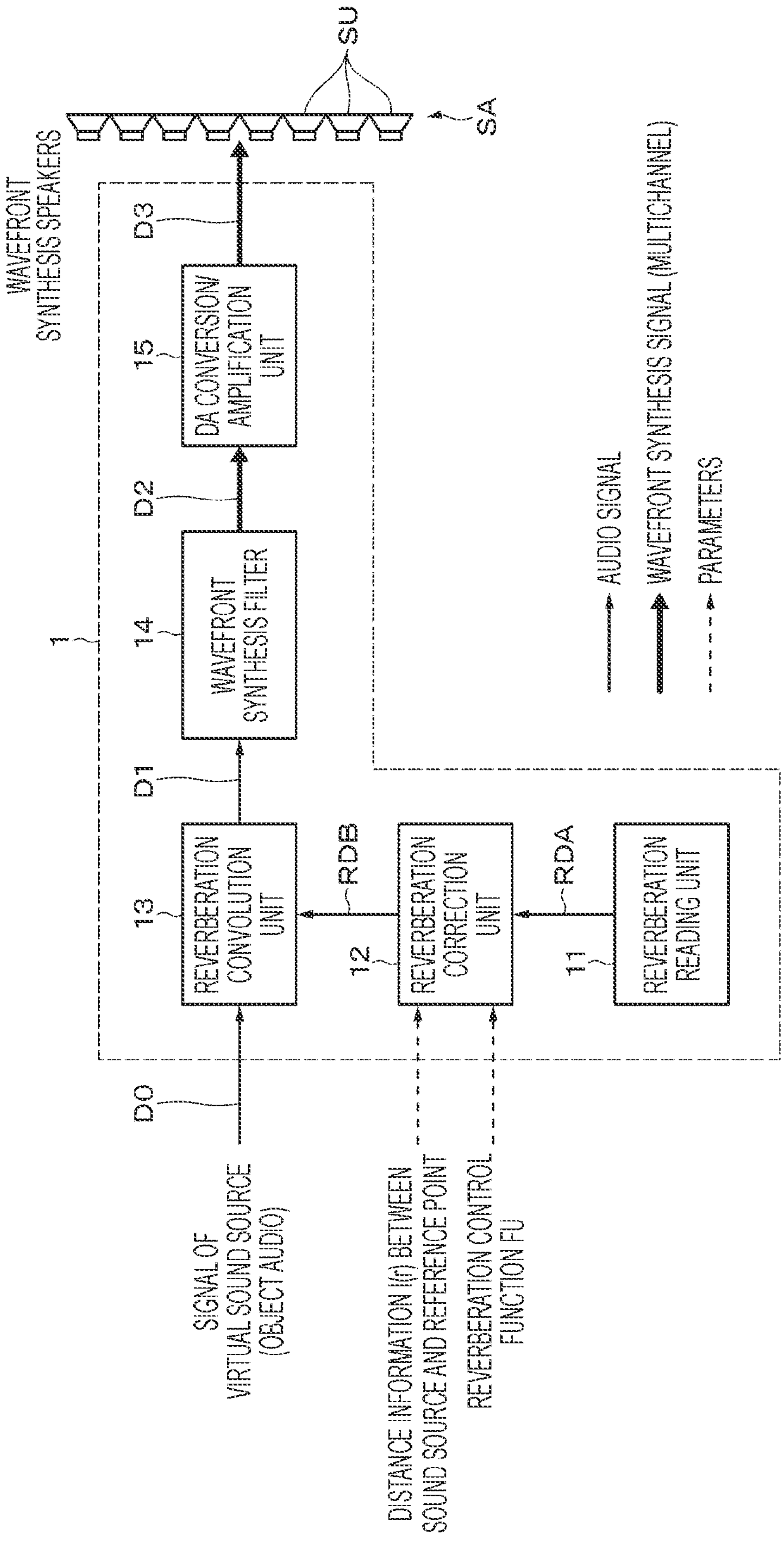
FIG. 6 is a diagram for describing a configuration example of a signal processing device according to the first embodiment.

FIG. 6 is a diagram for describing a configuration example of a signal processing device (signal processing device 1) according to the first embodiment. In FIG. 6, a thin arrow indicates the flow of an audio signal, a thick arrow indicates the flow of a drive signal (wavefront synthesis signal (multichannel signal including signals of eight channels in this example)), and a dotted arrow indicates the flow of parameters.

A signal of the virtual sound source VS (hereinafter referred to as a virtual sound source signal D0) is input to the signal processing device 1. The virtual sound source signal D0 is, for example, a monaural signal of one channel, and is an object audio signal corresponding to a predetermined object. The signal of the virtual sound source signal VS may be read from an appropriate memory or may be distributed from a network such as the Internet. Note that, in the wavefront synthesis system, information indicating the position of the virtual sound source VS is also input to the signal processing device 1, but illustration of this point is omitted.

Furthermore, distance information I(r) indicating the distance r measured by a distance measuring device or the like and a reverberation control function FU illustrated in FIG. 5 are input to the signal processing device 1. Note that the signal processing device 1 may have a configuration including the above-described distance measuring device, or may have a configuration in which the reverberation control function FU is held in a memory in advance.

When the signal processing device 1 performs processing, the drive signal for driving the speaker array SA is generated. The drive signal includes signals of channels (ch) corresponding to the number of the speaker units SU included in the speaker array SA. In the example illustrated in FIG. 6, since the speaker array SA includes eight speaker units SU, the signal processing device 1 outputs the drive signal including the signals of eight channels to be supplied to the speaker units SU. Note that, in an actual wavefront synthesis system, a larger number of speaker units SU are generally used, but in the present example, the description will be made assuming that the speaker array SA includes eight speaker units SU in consideration of convenience of description.

The signal processing device 1 includes, for example, a reverberation reading unit 11, a reverberation correction unit 12, a reverberation convolution unit 13, a wavefront synthesis filter 14, and a digital-to-analog (DA) conversion/amplification unit 15. The reverberation reading unit 11 reads a signal corresponding to reverberation from an appropriate memory. The signal corresponding to the reverberation may be distributed via a network such as the Internet, and in this case, the reverberation reading unit 11 functions as a communication unit connectable to the network. The reverberation reading unit 11 outputs a signal RDA corresponding to the read reverberation to the reverberation correction unit 12.

The reverberation correction unit 12, which is an example of a reverberation sound signal generation unit, specifies, for example, the level of the reverberation corresponding to the distance information I(r) by using the reverberation control function FU. The reverberation correction unit 12 then generates a reverberation sound signal RDB by adjusting the level of the signal RDA corresponding to the reverberation on the basis of the specified level. The reverberation correction unit 12 outputs the generated reverberation sound signal RDB to the reverberation convolution unit 13. That is, in the present embodiment, the reverberation correction unit 12 corresponds to the reverberation sound signal generation unit. Note that the reverberation time may be adjusted instead of the level of the reverberation, or the reverberation time may be adjusted together with the level of the reverberation.

The reverberation convolution unit 13 performs processing of convolving the reverberation sound signal RDB with the virtual sound source signal D0 to generate a convolution signal D1. Since the convolution processing is generally performed by converting a signal into a frequency domain signal, the reverberation convolution unit 13 may include fast Fourier transform (FFT) or the like. The reverberation convolution unit 13 outputs the convolution signal D1 to the wavefront synthesis filter 14.

The wavefront synthesis filter 14, which is an example of a drive signal generation unit, generates a drive signal D2 by performing wavefront synthesis filtering on the convolution signal D1. For example, the wavefront synthesis filter 14 converts the convolution signal D1 into a multichannel signal (eight channels in this example), and appropriately adjusts the phase, gain, delay, and the like of each signal included in the multichannel signal to reproduce such a wavefront that the virtual sound source signal D0 is localized at a predetermined position. As a result, the drive signal D2 including the signals of eight channels is output from the wavefront synthesis filter 14. As an algorithm of the processing performed by the wavefront synthesis filter 14, any algorithm is used according to the processing capability of a calculator, the arrangement of the speakers, or the like. Specifically, a higher order ambisonics (HOA) method, a weighted mode matching method, a spectral division method, or the like can be applied.

The DA conversion/amplification unit 15 converts the drive signal D2 in a digital format into a drive signal D3 in an analog format and amplifies the drive signal D3. As a result, the drive signal D3 in the analog format is generated. The signal of each channel included in the drive signal D3 is supplied to a corresponding one of the speaker units SU and reproduced. Note that a component including the wavefront synthesis filter 14 and the DA conversion/amplification unit 15 may be a component corresponding to the drive signal generation unit.

[Operation Example of Signal Processing Device]

Figure 7:
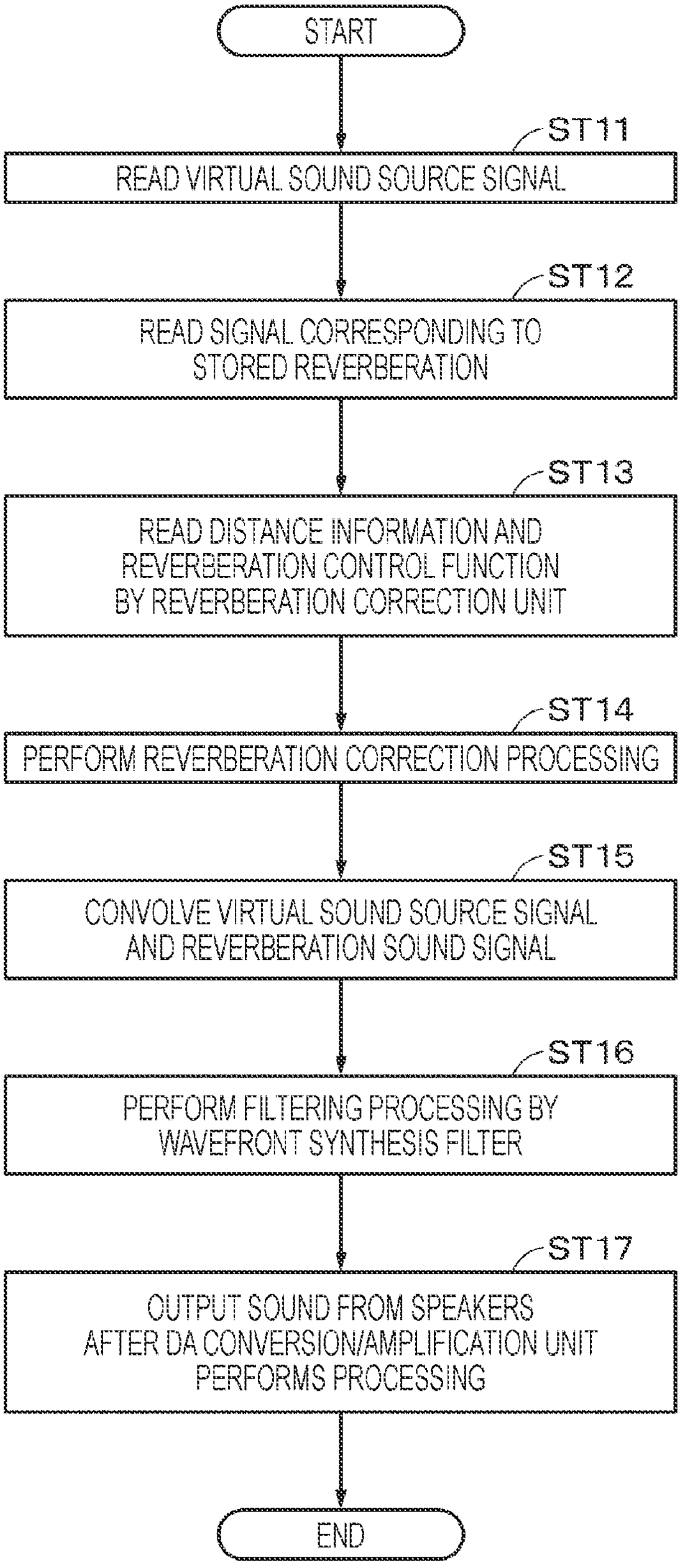
FIG. 7 is a flowchart that is referred to when an operation example of the signal processing device according to the first embodiment is described.

Next, an operation example of the signal processing device 1 will be described with reference to the flowchart illustrated in FIG. 7. In step ST11, the virtual sound source signal D0 is read. The read virtual sound source signal D0 is supplied to the reverberation convolution unit 13. The processing then proceeds to step ST12.

In step ST12, the reverberation reading unit 11 reads the signal RDA corresponding to the reverberation. Note that the signal RDA corresponding to the reverberation may be generated. The processing then proceeds to step ST13.

In step ST13, the reverberation correction unit 12 reads the distance information I(r) and the reverberation control function FU. The processing then proceeds to step ST14.

In step ST14, the reverberation correction unit 12 performs reverberation correction processing. By such processing, the reverberation sound signal RDB is generated. Specifically, the signal RDA corresponding to the reverberation is corrected on the basis of the distance information I(r) and the reverberation control function FU, so that the reverberation sound signal RDB is generated. The generated reverberation sound signal RDB is output to the reverberation convolution unit 13. The processing then proceeds to step ST15.

In step ST15, the reverberation convolution unit 13 performs processing of convolving the virtual sound source signal D0 and the reverberation sound signal RDB. By such processing, the convolution signal D1 is generated. The processing then proceeds to step ST16.

In step ST16, the wavefront synthesis filter 14 performs filtering processing. By such processing, the drive signal D2 in the digital format is generated. The processing then proceeds to step ST17.

In step ST17, the DA conversion/amplification unit 15 performs processing. By such processing, the drive signal D3 in the analog format is generated, and the drive signal D3 is amplified. The signal of each channel of the drive signal D3 is supplied to a corresponding one of the speaker units SU, and the sound is reproduced from the speaker units SU.

Note that the order of the flow of the above-described processing may be appropriately changed, or a plurality of pieces of processing may be performed in parallel.

According to the present embodiment described above, reverberation that does not depend on the position of the listener L can be added in the wavefront synthesis system. Furthermore, even in a case where the position of the listener L changes, appropriate reverberation can be added.

Note that, in a case where there is a plurality of virtual sound sources VS, that is, in a case where there is a plurality of virtual sound source signals D0, the signal corresponding to the reverberation may be the same signal for all the virtual sound source signals D0 or a different signal for each virtual sound source signal D0. Furthermore, in a case where there is a plurality of signals corresponding to reverberation, the reverberation control function FU may be the same function for the signals or a different function for each signal.

[Modification of First Embodiment]

Figure 8:
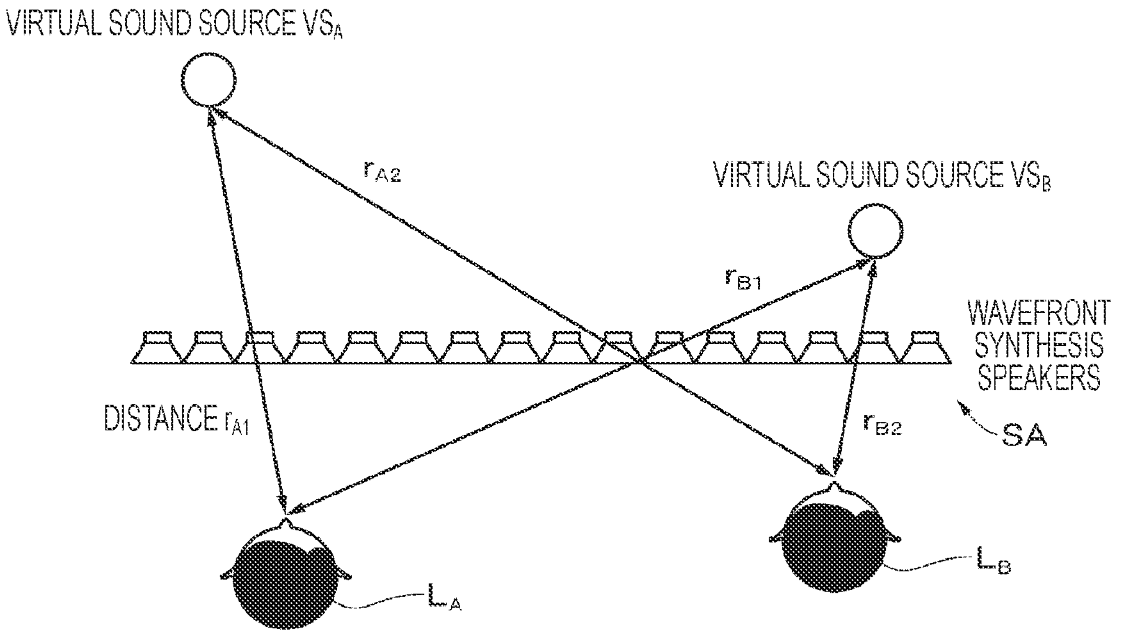
FIG. 8 is a diagram that is referred to when a modification of the first embodiment is described.

In the above description, an example is assumed in which one listener is present for one or a plurality of virtual sound sources, but there may be a plurality of listeners. FIG. 8 is a diagram schematically illustrating such a situation. As illustrated in FIG. 8, for example, a virtual sound source $VS_A$ and a virtual sound source $VS_B$ exist as virtual sound sources. Furthermore, there are a listener $L_A$ and a listener $L_B$ as listeners. A distance from the listener $L_A$ to the virtual sound source $VS_A$ is defined as a distance $r_{A1}$, and a distance from the listener $L_A$ to the virtual sound source $VS_B$ is defined as a distance $r_{B1}$. A distance from the listener $L_B$ to the virtual sound source $VS_A$ is defined as a distance $r_{A2}$, and a distance from the listener $L_B$ to the virtual sound source $VS_B$ is defined as a distance $r_{B2}$.

For example, adding reverberation to the virtual sound source $VS_A$ and the virtual sound source $VS_B$ with reference to the listener $L_A$ will be considered. At this time, the relationship of the distance from the listener $L_A$ to each virtual sound source is $r_{A1}<r_{B1}$, and thus, in a case where processing similar to that in the embodiment is performed, the reverberation added to the virtual sound source $VS_B$ is set to be larger and longer than the reverberation added to the virtual sound source $VS_A$. As described above, this setting represents, by wavefront synthesis, a phenomenon that reverberation of a far sound source is relatively large. However, in a case where the listener $L_B$ listens to the sound to which reverberation is added as described above, the reverberation of the virtual sound source $VS_B$ is heard more loudly although the relationship of the distance from the listener $L_B$ to each virtual sound source is $r_{A2}>r_{B2}$.

One of advantages of the wavefront synthesis system is that a plurality of people can simultaneously listen to the same wavefront, and it is quite likely that there is a plurality of listeners. In a case where there is a plurality of listeners, using the shortest distance between a sound source and a listener causes reverberation to be optimized only for the listener. Therefore, for example, in a case where the presence of a plurality of listeners is detected by the distance measuring device or the like, or in a case where a predetermined mode is set, the distance that minimizes the distance between the virtual sound source and the speaker array SA is set as the distance r.

Figure 9:
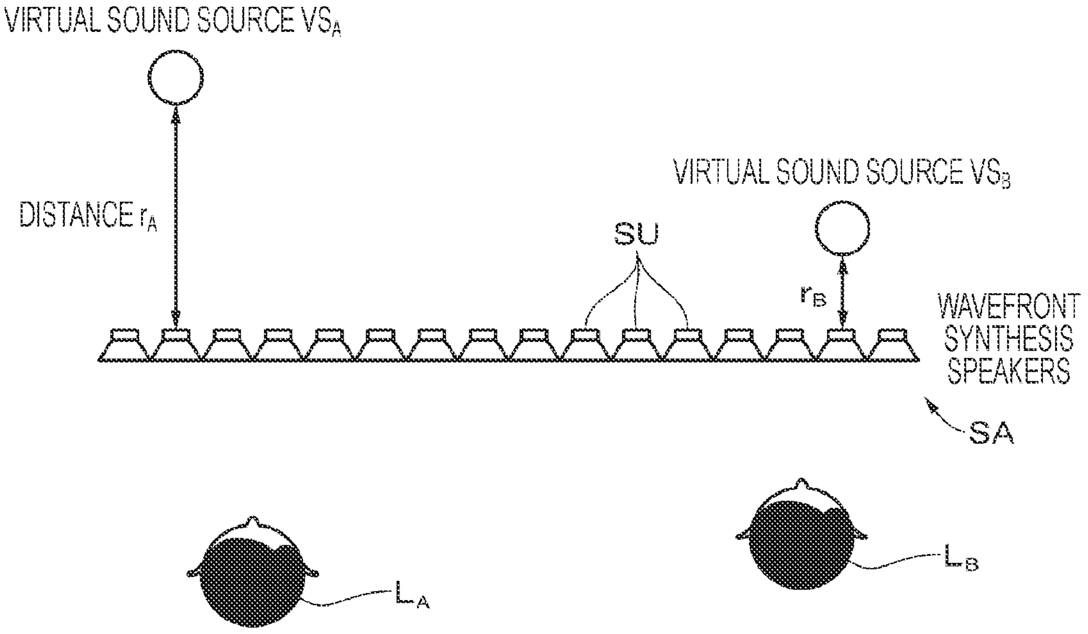
FIG. 9 is a diagram that is referred to when the modification of the first embodiment is described.

Specifically, as illustrated in FIG. 9, the shortest distance from the virtual sound source $VS_A$ to the speaker array SA is set as a distance $r_A$, and the shortest distance from the virtual sound source $VS_B$ to the speaker array SA is set as a distance $r_B$. The shortest distance to the speaker array SA is defined as the shortest distance to a predetermined one of the speaker units SU included in the speaker array SA, but may be defined with reference to another position of the speaker array SA (for example, a sound emission surface). Processing in which pieces of reverberation each having the level or time corresponding to one of the distance $r_A$ and the distance $r_B$ are respectively added to the virtual sound source $VS_A$ and the virtual sound source $VS_B$ is the same as the above-described processing, and thus redundant description will be omitted.

As a result, it is possible to avoid a situation in which reverberation differ for each listener as illustrated in FIG. 8 and to achieve consistency in reverberation of the virtual sound sources in the entire space in which the speaker array SA is installed. Therefore, it is possible to prevent the number of listeners or movement of each listener causing the above-described inconvenience.

Figure 10:
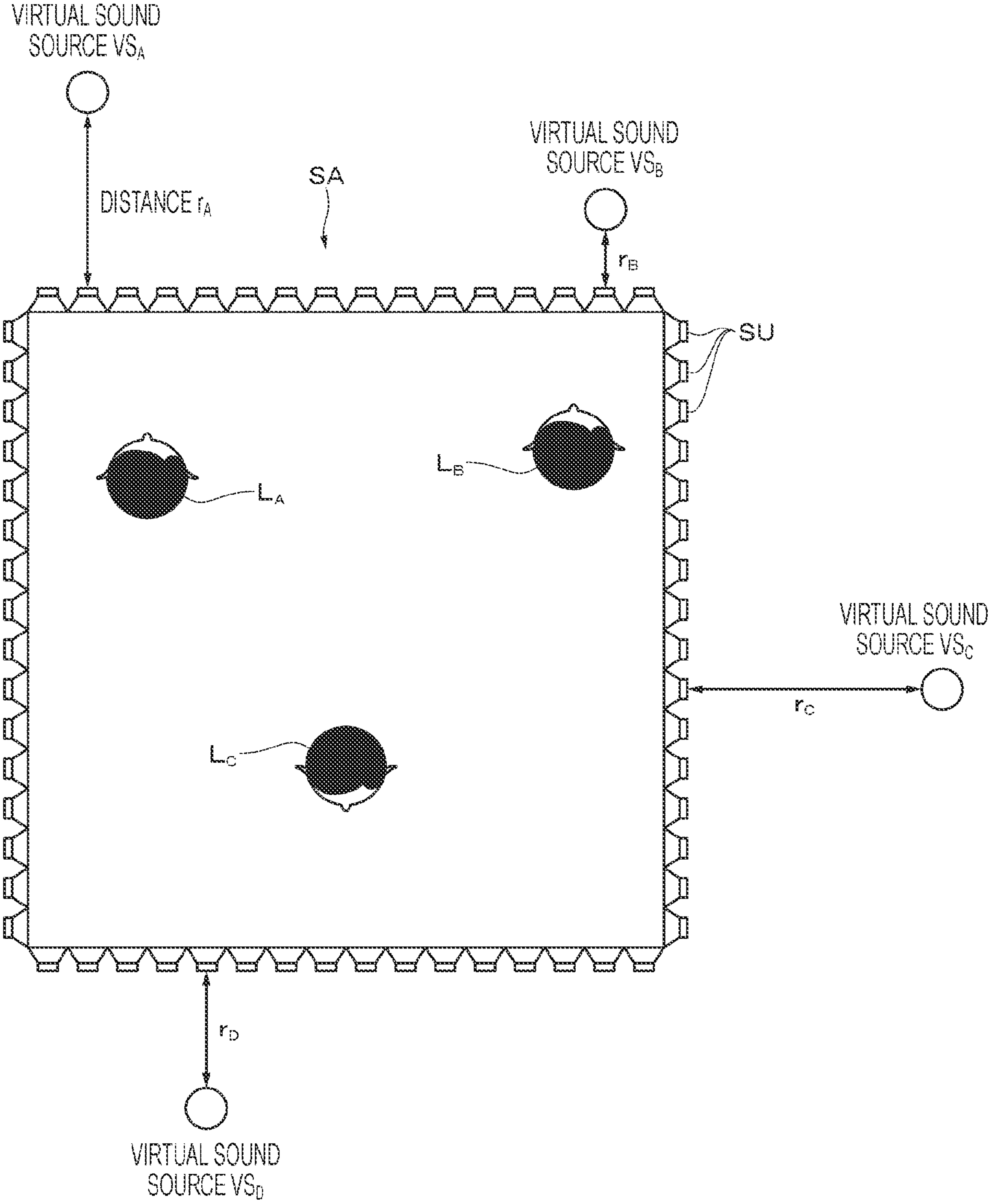
FIG. 10 is a diagram that is referred to when the modification of the first embodiment is described.

Note that, although the speaker array SA in which the speaker units SU are arranged on a straight line has been described above as an example, the speaker units SU may be arranged in a rectangular shape (four directions), for example, as illustrated in FIG. 10, or may be arranged along a circular shape or any other shape. Note that, in the example illustrated in FIG. 10, since there is a plurality of listeners inside the speaker array SA, the shortest distance from each virtual sound source to the speaker array SA is set as the distance r.

Second Embodiment

Next, a second embodiment will be described. Note that, in the description of the second embodiment, the same or similar components in the above description are denoted by the same reference signs, and redundant description will be appropriately omitted. Furthermore, the matters described in the first embodiment can be applied to the second embodiment unless otherwise noted.

[Outline]

In the first embodiment, it is possible to add reverberation without significantly changing the framework of a general wavefront synthesis system. The second embodiment is an embodiment in which a reflection component of reverberation is newly generated as a virtual sound source, and more effective reverberation can be added.

Reverberation includes a reflected sound following a direct sound. This reflected sound is observed when a sound wave reflected on a ceiling, a floor, or a wall reaches a sound reception point. That is, it can be considered that the reflected sound does not arrive from the position of a sound source, but arrives from the reflected point. Therefore, on the assumption that the reflected point is a sound source that generates the reflected sound, it is possible to perform wavefront synthesis while the reflected sound is set as a virtual sound source.

Figure 11:
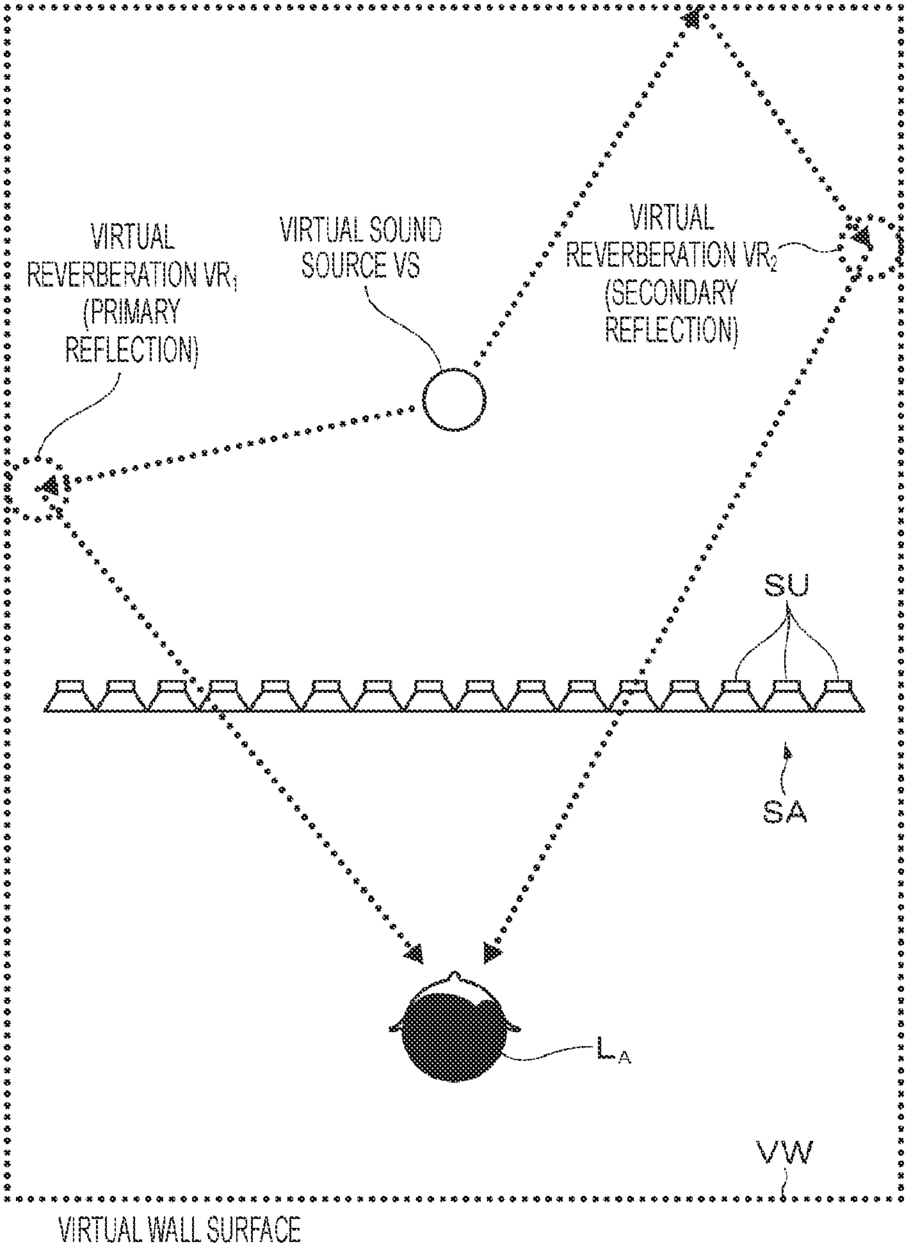
FIG. 11 is a diagram for describing an outline of a second embodiment.

FIG. 11 is a diagram for describing an outline of the second embodiment. In the present embodiment, a reflected sound of reverberation is made into a virtual sound source and then subjected to wavefront synthesis. For example, a reflected sound of primary reflection is virtually reverberated as virtual reverberation $VR_1$. Furthermore, a reflected sound of secondary reflection is virtually reverberated as virtual reverberation $VR_2$. Note that although reflection occurs multiple times at various locations, only the primary and secondary reflections are illustrated in FIG. 11 for simplicity. Making a reflected sound into a virtual sound source can be implemented by placing the virtual sound source at the final reflection point (near a wall in this example) of the route through which the reflected sound reaches a listener L. Since reflection occurs not only on a wall but also on a ceiling, a floor, an object on the spot, or the like, the virtual sound source may be placed at those places. Since a position where the reflected sound made into the virtual sound source is arranged is required, virtual space information is input to a signal processing device. The virtual space information is, for example, information set in advance by a creator or the like.

Figure 12:
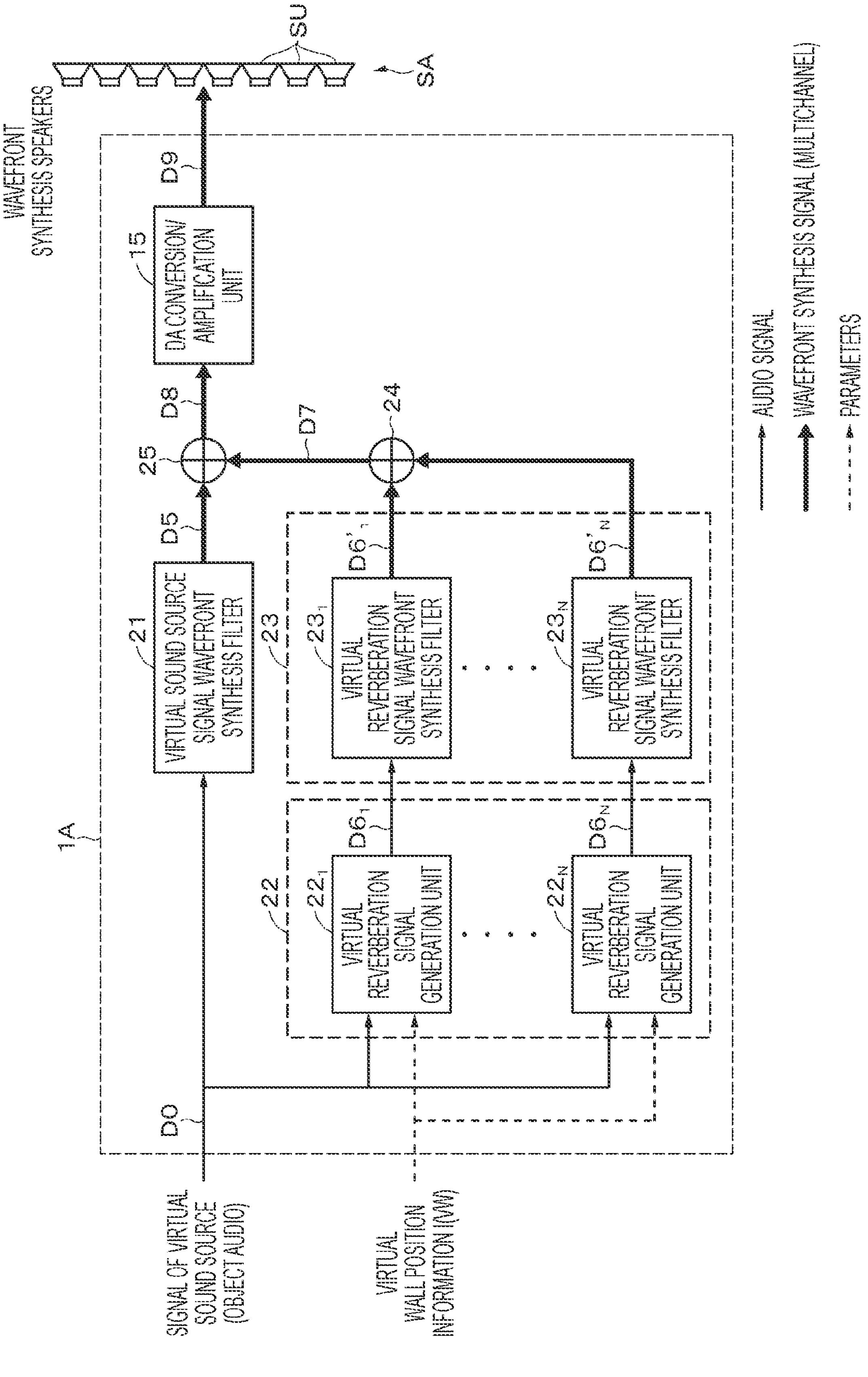
FIG. 12 is a diagram for describing a configuration example of a signal processing device according to the second embodiment.

FIG. 12 is a diagram for describing a configuration example of a signal processing device (signal processing device 1A) according to the second embodiment. The signal processing device 1A includes a virtual sound source signal wavefront synthesis filter 21, a virtual reverberation signal generation unit 22, a virtual reverberation signal wavefront synthesis filter 23, an adder 24, an adder 25, and a DA conversion/amplification unit 15. Reflection may occur at N locations, not at one location, and thus N signals of reflected sounds made into virtual sound sources (hereinafter, referred to as virtual reverberation signals as appropriate) are generated. Therefore, the virtual reverberation signal generation unit 22 includes N virtual reverberation signal generation units (a virtual reverberation signal generation unit $\mathbf{22}_1$ to a virtual reverberation signal generation unit $\mathbf{22}_N$). For a similar reason, the virtual reverberation signal wavefront synthesis filter 23 also includes N virtual reverberation signal wavefront synthesis filters (a virtual reverberation signal wavefront synthesis filter $\mathbf{23}_1$ to a virtual reverberation signal wavefront synthesis filter $\mathbf{23}_N$). Note that, in a case where it is not necessary to distinguish the individual virtual reverberation signal generation units, the virtual reverberation signal generation units are appropriately collectively referred to as the virtual reverberation signal generation unit. Furthermore, in a case where it is not necessary to distinguish the virtual reverberation signal wavefront synthesis filters, the virtual reverberation signal wavefront synthesis filters are appropriately collectively referred to as the virtual reverberation signal wavefront synthesis filter 23.

The signal processing device 1A is supplied with a virtual sound source signal D0. The virtual sound source signal D0 is branched and also supplied to the virtual reverberation signal generation unit 22. Furthermore, the virtual reverberation signal generation unit 22 is supplied with virtual wall position information I(VW) indicating the position of a virtual wall with respect to a predetermined virtual sound source VS, which serves as an example of the virtual space information.

The virtual sound source signal wavefront synthesis filter 21 performs filtering processing on the virtual sound source signal D0 by a wavefront synthesis filter. The wavefront synthesis filtering is performed to generate an output signal D5. For example, the virtual sound source signal wavefront synthesis filter 21 converts the virtual sound source signal D0 into a multichannel signal (eight channels in this example), and appropriately adjusts the phase, gain, delay, and the like of each signal included in the multichannel signal to reproduce such a wavefront that the virtual sound source signal D0 is localized at a predetermined position. As a result, the output signal D5 including the signals of eight channels is output from the virtual sound source signal wavefront synthesis filter 21. As an algorithm of the processing performed by the virtual sound source signal wavefront synthesis filter 21, any algorithm is used according to the processing capability of a calculator, the arrangement of speakers, and the like. Specifically, a HOA method, a weighted mode matching method, a spectral division method, or the like can be applied.

The virtual reverberation signal generation unit 22 acquires the virtual sound source signal D0, the sound source position of the virtual sound source signal D0, and the virtual wall position information I (VW), and generates a virtual reverberation signal D6 (D$\mathbf{6}_1$ to D$\mathbf{6}_N$). For example, the virtual reverberation signal generation unit 22 performs processing of specifying the reflection position of the virtual reverberation signal D6, in other words, processing of specifying the position where the virtual reverberation signal D6 is localized. The reflection position of the virtual reverberation signal D6 can be calculated, for example, by simulation of sound propagation using a method of mirror images or the like. For example, the virtual reverberation signal generation unit 22 refers to the virtual wall position information I(VW) and sets the reflection position of the virtual reverberation signal D$\mathbf{6}_1$ of the primary reflection at the position of a wall closest to the reproduction position of the virtual sound source signal D0. As described above, in the present embodiment, the virtual reverberation signal D6 (D$\mathbf{6}_1$ to D$\mathbf{6}_N$), which is a reverberation sound signal in the present embodiment, is generated according to the sound source position of the virtual sound source VS and the distance to the surface reflecting the virtual sound source signal D0.

The virtual reverberation signal wavefront synthesis filter 23 performs wavefront synthesis filtering processing on the virtual reverberation signal D6 to generate a virtual reverberation signal D6'(D$\mathbf{6'}_1$ to D$\mathbf{6'}_N$) obtained by making the virtual reverberation signal D6 into a virtual sound source. For example, the virtual reverberation signal wavefront synthesis filter $\mathbf{23}_1$ converts the virtual reverberation signal D$\mathbf{6}_1$ into a multichannel signal (eight channels in this example), and adjusts the phase, gain, delay, and the like of each signal included in the multichannel signal such that the virtual reverberation signal D$\mathbf{6}_1$ is localized at a predetermined position (along the wall). As a result, the virtual reverberation signal D$\mathbf{6'}_1$ including the signals of eight channels is output from the virtual reverberation signal wavefront synthesis filter $\mathbf{23}_1$. As an algorithm of the processing performed by the virtual reverberation signal wavefront synthesis filter $\mathbf{23}_1$, any algorithm is used according to the processing capability of the calculator, the arrangement of the speakers, and the like. Specifically, a HOA method, a weighted mode matching method, a spectral division method, or the like can be applied.

The adder 24 adds signals of corresponding channels included in the virtual reverberation signal D6' obtained by making the virtual reverberation signal D6 into the virtual sound source, specifically, the virtual reverberation signals D$\mathbf{6'}_1$ to D$\mathbf{6'}_N$. As a result of the addition processing by the adder 24, an output signal D7 including signals of eight channels is output from the adder 24.

A drive signal for each of speaker units SU is generated on the basis of the virtual reverberation signal D6' obtained by making the virtual reverberation signal D6 into the virtual sound source. Specifically, the adder 25 adds the output signal D5 obtained by performing wavefront synthesis filtering on the virtual sound source signal D0 and the output signal D7 output from the adder 24 for each corresponding channel. A drive signal D8 including signals of eight channels in a digital format is generated by the addition processing by the adder 25. The generated drive signal D8 is output from the adder 25.

The DA conversion/amplification unit 15 converts the drive signal D8 in the digital format into a signal in an analog format and then amplifies the converted signal to generate and output a drive signal D9. The signal of each channel of the drive signal D9 in the analog format is supplied to a corresponding one of the speaker units SU, and the sound is reproduced from the speaker units SU.

As described above, in the present embodiment, for example, a component including the virtual reverberation signal generation unit 22 and the virtual reverberation signal wavefront synthesis filter 23 corresponds to a reverberation sound signal generation unit. Furthermore, for example, a component including the virtual sound source signal wavefront synthesis filter 21, the adder 24, and the adder 25 (which may include the DA conversion/amplification unit 15) corresponds to a drive signal generation unit.

According to the second embodiment described above, making reverberation into a virtual sound source makes it possible to arrange the reverberation at any position. Therefore, reverberation can be appropriately reproduced.

Note that, in the second embodiment, the number of reflections (primary, secondary, and tertiary reflections) can be set to any number. Furthermore, since the attenuation rate of reflection varies depending on the material and shape of a wall, virtual reverberation may be generated in consideration of these. Generating and reproducing the virtual reverberation in consideration of the material and shape of the wall makes it possible to give a higher realistic feeling to a listener.

[Modifications of Second Embodiment]

Next, modifications of the second embodiment will be described. In the above-described wavefront synthesis system that makes reverberation into a virtual sound source, a wavefront synthesis filter requires a larger number of calculations as the order of reflection increases, which increases the amount of computation. Such a problem is disadvantageous, for example, in an application that processes the wavefront synthesis system online.

A normal wavefront synthesis filter is designed by the number and arrangement of installed speakers and the order of a wavefront to be reproduced. Thinning out the number of speakers and lowering the reproduction order make it possible to reduce the amount of computation for wavefront synthesis filtering processing. When the order is lowered, the resolution of the wavefront to be reproduced is lowered, and thus, a trade-off occurs between the sound quality and the amount of computation. However, in general, the gain of a reflection component is smaller than that of a direct sound, and a listener does not strictly listen to only the reflection. Therefore, it is considered that performing wavefront synthesis on a reverberation component with a low order contributes to improvement of a realistic feeling without problems. In view of the above point, the modifications of the second embodiment will be described.

(First Modification)

Figure 13:
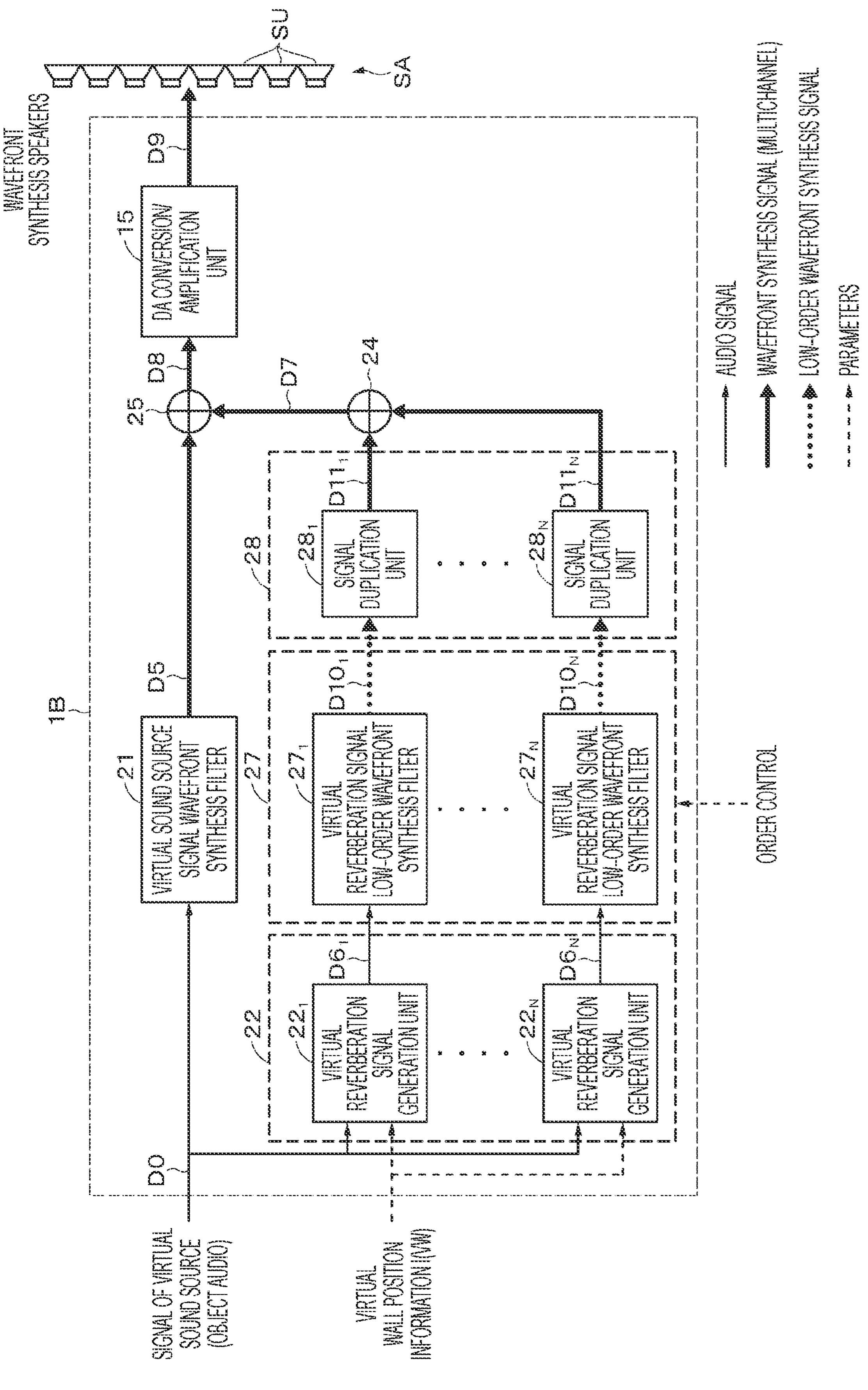
FIG. 13 is a diagram for describing a configuration example of a signal processing device according to a modification of the second embodiment.

First, a first modification will be described. FIG. 13 is a diagram for describing a configuration example of a signal processing device (signal processing device 1B) according to the present modification. The signal processing device 1B is different from the signal processing device 1A in that the signal processing device 1B includes a virtual reverberation signal low-order wavefront synthesis filter 27 (virtual reverberation signal low-order wavefront synthesis filters $\mathbf{27}_1$ to $\mathbf{27}_N$) instead of the virtual reverberation signal wavefront synthesis filter 23, and includes a signal duplication unit 28 (signal duplication units $\mathbf{28}_1$ to $\mathbf{28}_N$). Note that N is a value corresponding to the order of reflection as in the second embodiment.

Figure 14:
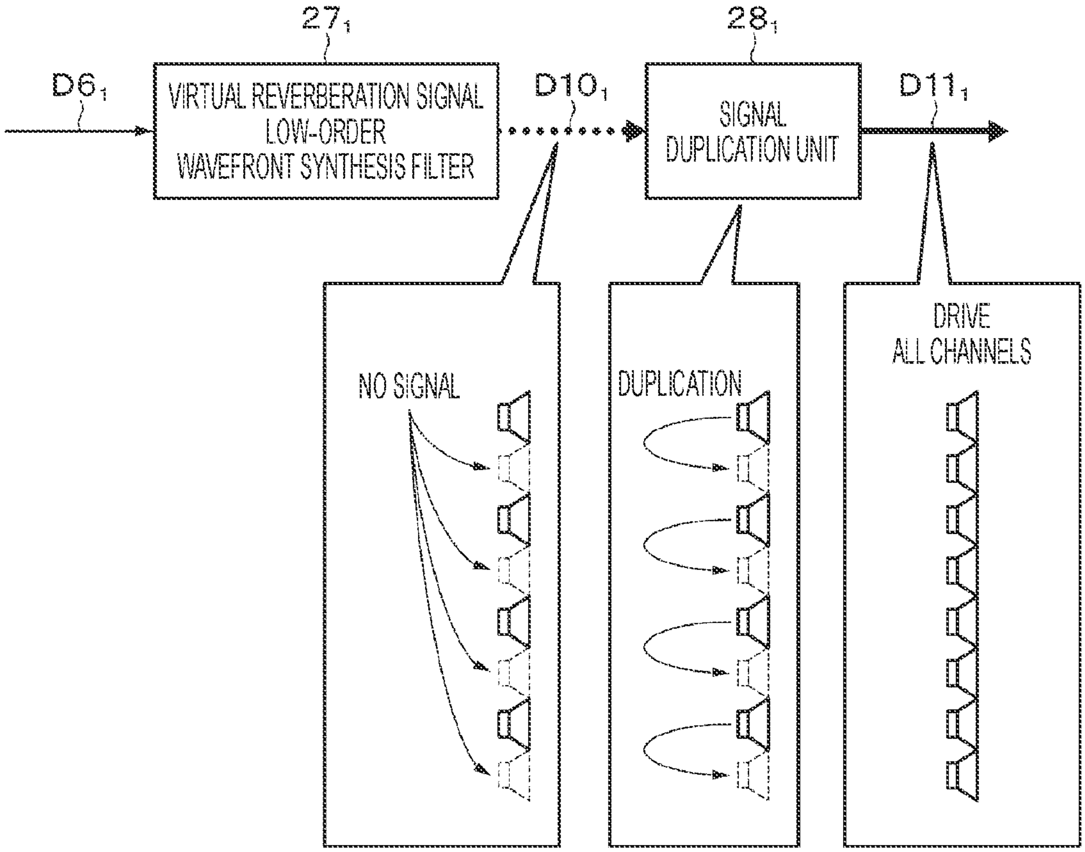
FIG. 14 is a diagram that is referred to when an operation example of the signal processing device according to the modification of the second embodiment is described.

Operations of the virtual reverberation signal low-order wavefront synthesis filter 27 and the signal duplication unit 28 will be described with reference to FIG. 14. Note that, in FIG. 14, the virtual reverberation signal low-order wavefront synthesis filter $\mathbf{27}_1$ and the signal duplication unit $\mathbf{28}_1$ are illustrated, but other virtual reverberation signal low-order wavefront synthesis filters and signal duplication units operate similarly.

The virtual reverberation signal low-order wavefront synthesis filter $\mathbf{27}_1$ performs wavefront synthesis filtering on the virtual reverberation signal $D\mathbf{6}_1$, but outputs a signal in which channels are thinned out. For example, as illustrated in FIG. 14, the virtual reverberation signal low-order wavefront synthesis filter $\mathbf{27}_1$ outputs a signal $D\mathbf{10}_1$ obtained by making the virtual reverberation signal $D\mathbf{6}_1$ into a virtual sound source. The signal $D\mathbf{10}_1$ has the number of channels (for example, four channels) smaller than the number of channels of a speaker array SA (eight channels in this example). The signal duplication unit $\mathbf{28}_1$ then interpolates the signal such that the sound is reproduced from all the speaker units SU included in the speaker array SA. As illustrated in FIG. 14, for example, for a thinned-out speaker having no signal, the signal duplication unit $\mathbf{28}_1$ duplicates a drive signal for a nearby speaker, more specifically, an adjacent speaker. By such processing, an output signal $D\mathbf{11}_1$ including signals of eight channels is generated, and the generated output signal $D\mathbf{11}_1$ is output. Since the operations of the adders 24 and 25 have already been described, redundant description will be omitted.

Note that interpolation processing may be performed in which signals for speakers on both sides of a speaker having no signal are averaged to generate a signal for the speaker having no signal. Furthermore, only the output of the virtual reverberation signal low-order wavefront synthesis filter 27 may be reproduced while signal duplication is not performed and the thinned-out speakers are left as they are. As described above, the amount of computation can be reduced.

(Second Modification)

Figure 15:
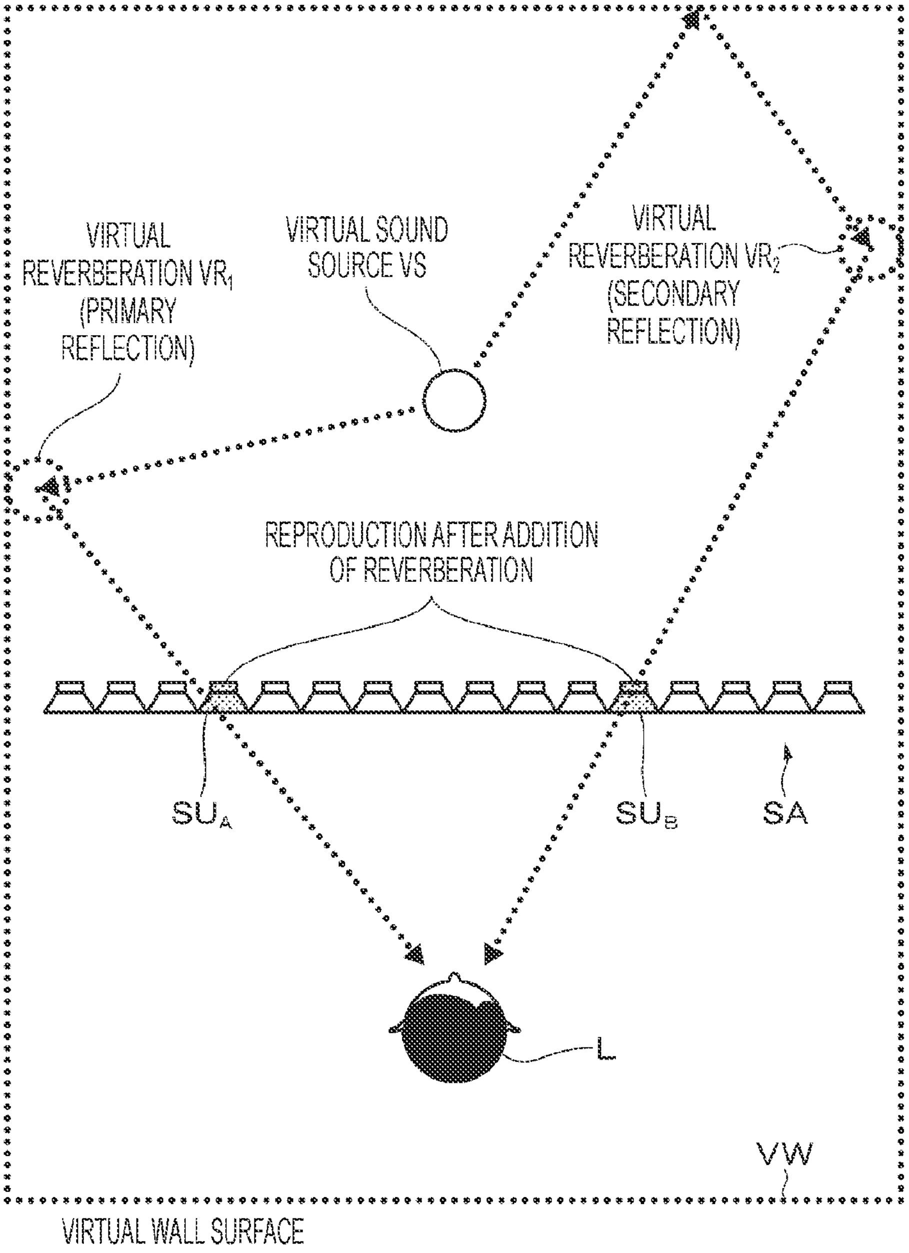
FIG. 15 is a diagram that is referred to when the modification of the second embodiment is described.

A configuration may be adopted in which wavefront synthesis is not performed on a reflection component and the reflection component is not made into a virtual sound source, so that the amount of computation may be reduced. As illustrated in FIG. 15, the position where virtual reverberation $VR_A$ corresponding to the primary reflection is localized is specified by the virtual reverberation signal generation unit 22. Furthermore, the position of the listener L can also be determined by imaging with a camera or the like. For example, the position where the virtual reverberation $VR_A$ is localized and the position of the listener L may be connected by a straight line, and the sound may be reproduced in a state where a reverberation component is added to a speaker unit located on the straight line (in FIG. 15, a speaker unit $SU_A$). Not only the position where the virtual reverberation $VR_A$ corresponding to the primary reflection is localized but also the position where virtual reverberation $VR_B$ corresponding to the secondary reflection is localized may be connected with the position of the listener L by a straight line, and the sound may be reproduced in a state where the reverberation component is added to a speaker unit located on the straight line (in FIG. 15, a speaker unit $SU_B$). Even by such processing, the amount of computation can also be reduced.

Figure 16:
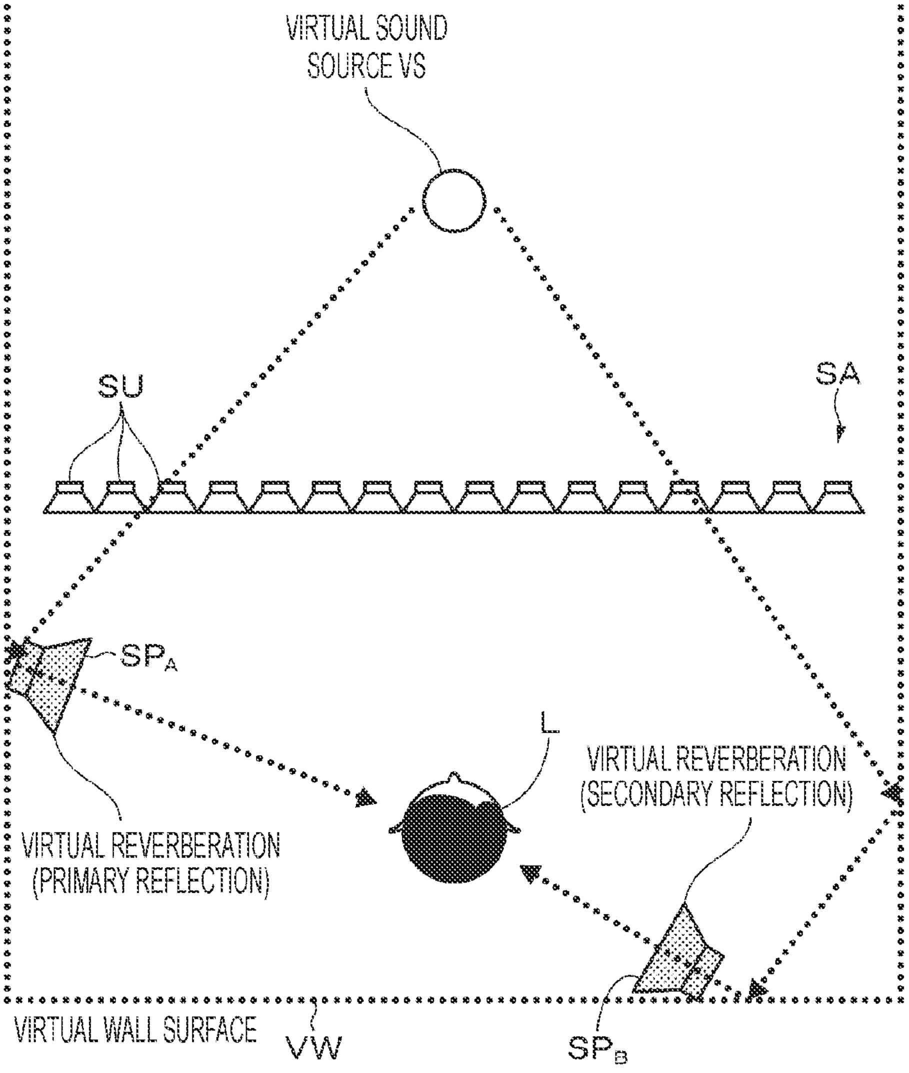
FIG. 16 is a diagram that is referred to when the modification of the second embodiment is described.

Furthermore, a reverberation speaker may be installed separately from the speaker array SA for wavefront synthesis, and reverberation may be reproduced from the speaker. For example, as illustrated in FIG. 16, a speaker $SP_A$ for reproducing virtual reverberation corresponding to the primary reflection and a speaker $SP_B$ for reproducing virtual reverberation corresponding to the secondary reflection may be arranged, so that the reverberation may be reproduced from the speaker $SP_A$ and the speaker $SP_B$. According to the method illustrated in FIG. 16, the reverberation can also be reproduced from the sides and rear, where no wavefront synthesis speaker is installed, so that it is possible to give the listener L a higher feeling of being surrounded by sound.

Third Embodiment

Next, a third embodiment will be described. Note that, in the description of the first and second embodiments, the same or similar components in the above description are denoted by the same reference signs, and redundant description will be appropriately omitted. Furthermore, the matters described in the first and second embodiments can be applied to the third embodiment unless otherwise noted.

In the first and second embodiments, the reflection of reverberation has been focused. However, other characteristics of reverberation include a feeling of being surrounded by sound and duration of sound. A feeling that the entire space in which a listener is located is sounding and the sound that continues for a long time, which are results of innumerable reflections occurring everywhere, are expressed as a component of late reverberation in FIGS. 3A and 3B. The present embodiment is an embodiment related to a method for effectively reproducing the late reverberation.

Figure 17:
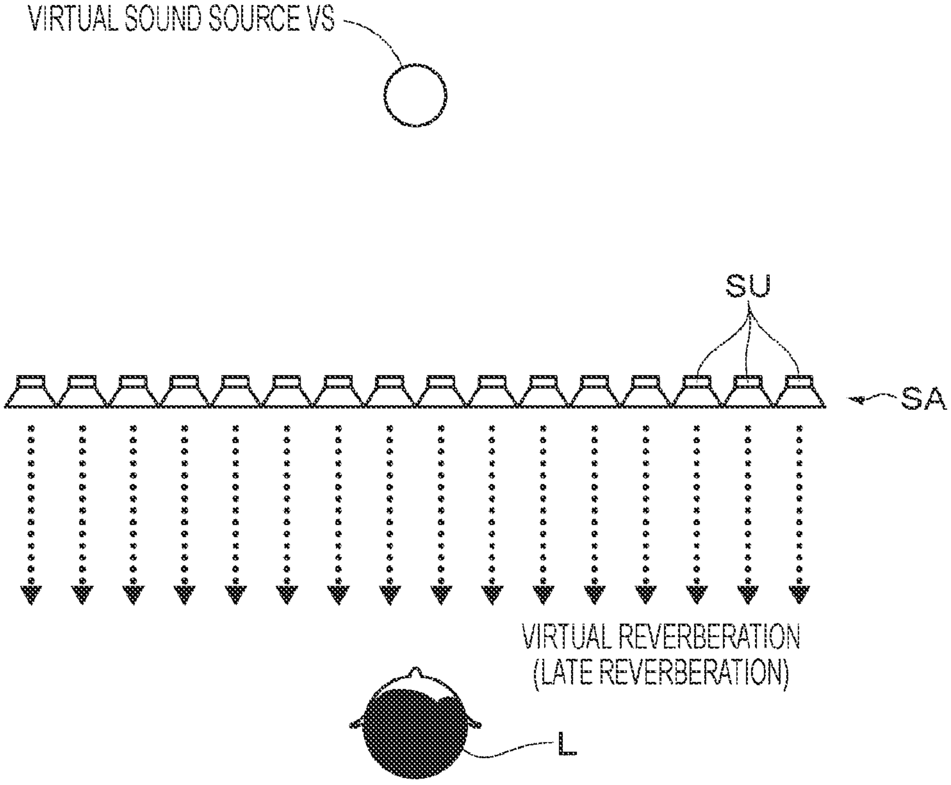
FIG. 17 is a diagram for describing an outline of a third embodiment.

FIG. 17 is a diagram for describing an outline of the third embodiment. In the third embodiment, the late reverberation is reproduced by use of a speaker array SA. In the late reverberation, since the entire space is sounding as described above, the entire speaker array AR, which is widely installed, is used to express the sound in the entire space.

Figure 18:
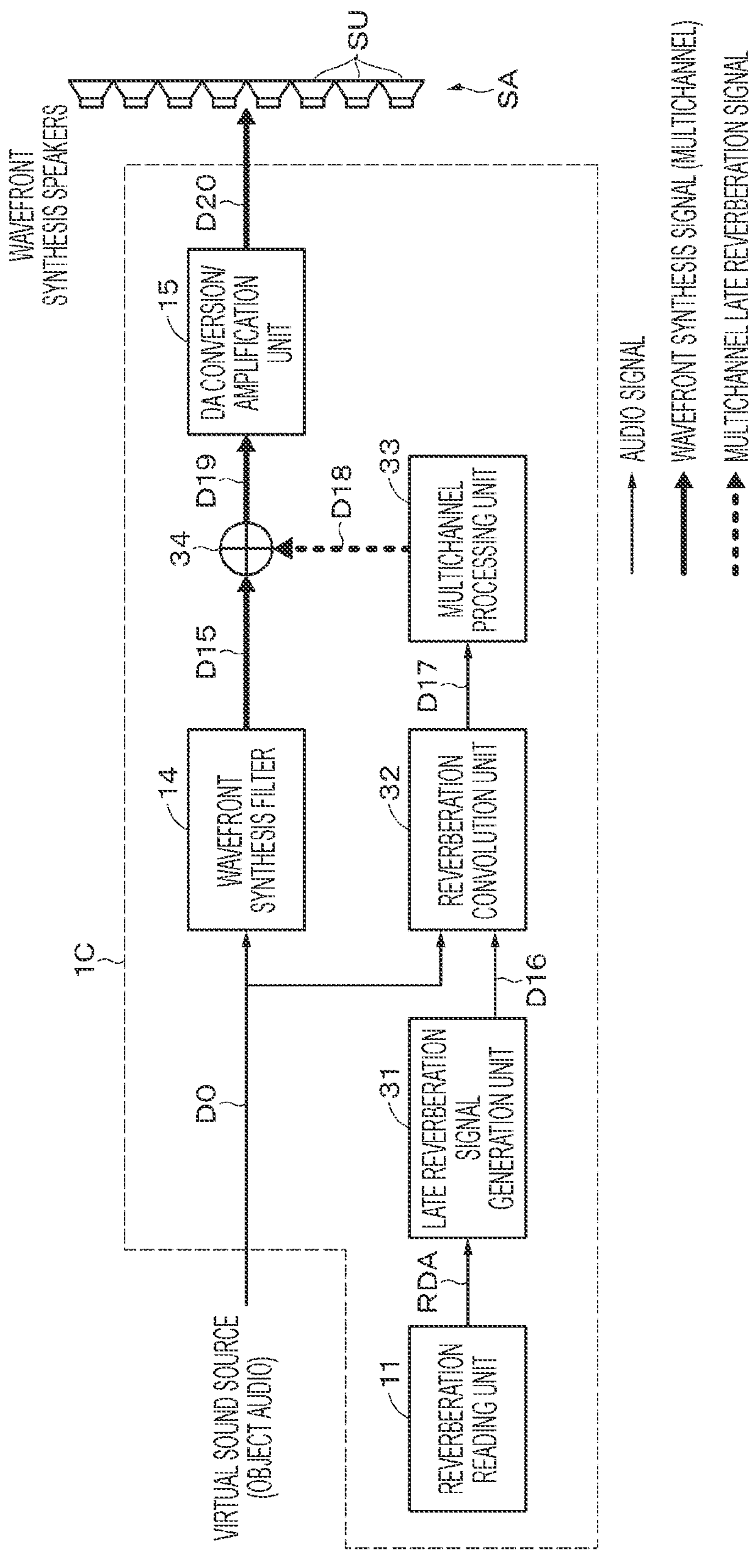
FIG. 18 is a diagram for describing a configuration example of a signal processing device according to the third embodiment.

FIG. 18 is a diagram for describing a configuration example of a signal processing device (signal processing device 1C) according to the third embodiment. In addition to the reverberation reading unit 11, the wavefront synthesis filter 14, and the DA conversion/amplification unit 15 included in the signal processing device 1 according to the first embodiment, the signal processing device 1C includes a late reverberation signal generation unit 31, a reverberation convolution unit 32, a multichannel processing unit 33, and an adder 34.

The wavefront synthesis filter 14 outputs a signal D15 by performing wavefront synthesis filtering on a virtual sound source signal D0.

Figure 19A:
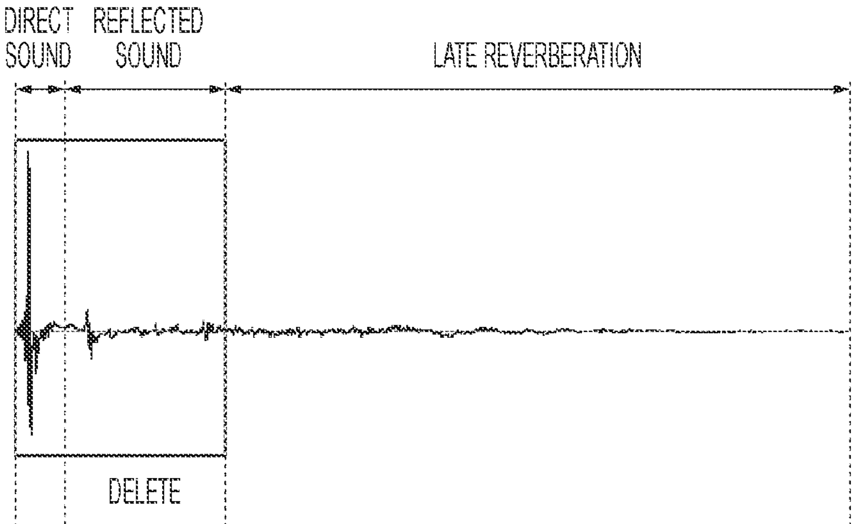
FIGS. 19A and 19B are diagrams that is referred to when processing of a late reverberation signal generation unit according to the third embodiment is described.
Figure 19B:
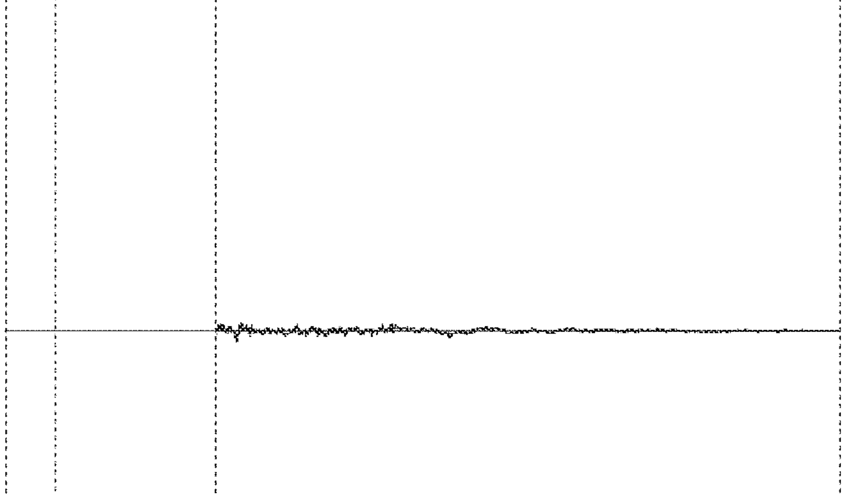

A signal RDA corresponding to reverberation output from the reverberation reading unit 11 is supplied to the late reverberation signal generation unit 31. The late reverberation signal generation unit 31 generates a late reverberation signal D16 on the basis of the signal RDA corresponding to the reverberation. For example, as schematically illustrated in FIGS. 19A and 19B, the late reverberation signal generation unit 31 generates the late reverberation signal D16 by deleting a direct sound and a reflected sound of an impulse response.

The reverberation convolution unit 32 performs processing of convolving the late reverberation signal D16 with the virtual sound source signal D0 to generate a convolution signal D17. The reverberation convolution unit 32 then outputs the generated convolution signal D17 to the multichannel processing unit 33.

The multichannel processing unit 33 performs processing of converting the convolution signal D17 into a multichannel signal so that the converted signal corresponds to the number of channels (eight channels in this example) of the speaker array SA. The multichannel processing unit 33 performs the processing to generate a multichannel late reverberation sound (hereinafter, a multichannel late reverberation signal D18). The multichannel late reverberation signal D18 is supplied to the adder 34.

The adder 34 adds the signal D15 output from the wavefront synthesis filter 14 and the multichannel late reverberation signal D18 for each corresponding channel. The adder 34 performs the processing to generate a drive signal D19 in a digital format.

The DA conversion/amplification unit 15 converts the drive signal D19 in the digital format into a signal in an analog format and then amplifies the converted signal to generate and output a drive signal D20. The signal of each channel of the drive signal D20 in the analog format is supplied to a corresponding one of speaker units SU, and the sound is reproduced from the speaker units SU.

According to the present embodiment described above, it is possible to reproduce late reverberation in a wide range, and it is possible to give a listener a feeling of being surrounded by sound. Furthermore, it is possible to reproduce the late reverberation component as if the entire space sounded without performing calculation by the wavefront synthesis filter.

Note that, in an actual space, the waveform of the impulse response differs depending on the observation point. In consideration of this point, a different piece of late reverberation may be used for each position of the speaker units SU, and signals obtained by convolving the pieces of late reverberation with the virtual sound source signal D0 may be reproduced. Furthermore, the late reverberation signal generation unit 31 may generate a pseudo late reverberation signal, and the generated pseudo late reverberation signal may be convolved with the virtual sound source signal D0.

<Modification>

Although the plurality of embodiments of the present disclosure has been specifically described above, the contents of the present disclosure are not limited to the above-described embodiments, and various modifications based on the technical idea of the present disclosure are possible.

The configurations, methods, steps, shapes, materials, numerical values, and the like described in the above-described embodiments and modifications are merely examples, and configurations, methods, steps, shapes, materials, numerical values, and the like different from those described above may be used as necessary, or those described above may be replaced with known ones. In addition, the configurations, methods, steps, shapes, materials, numerical values, and the like in the embodiments and the modifications can be combined with each other within a range in which no technical contradiction occurs.

Note that the contents of the present disclosure are not to be construed as being limited by the effects exemplified in the present specification.

The present disclosure can also adopt the following configurations.

(1)

A signal processing device including:

a reverberation sound signal generation unit that generates a reverberation sound signal according to a sound source position of a virtual sound source and a distance to a reference point; and a drive signal generation unit that generates a drive signal for a speaker array by a wavefront synthesis filter, in which the drive signal generation unit generates the drive signal on the basis of a signal obtained by performing wavefront synthesis filtering processing on a signal obtained by convolving the reverberation sound signal with a signal of the virtual sound source and/or a signal obtained by performing wavefront synthesis filtering processing on the reverberation sound signal to make the reverberation sound signal into a virtual sound source.

(2)

The signal processing device according to (1), in which the drive signal generation unit generates the drive signal by adding a signal obtained by performing wavefront synthesis filtering on the signal of the virtual sound source and the signal obtained by making the reverberation sound signal into the virtual sound source.

(3)

The signal processing device according to (1) or (2), in which the reference point is a position of a listener with respect to the sound source position of the virtual sound source.

(4)

The signal processing device according to (1) or (2), in which the reference point is a position of the speaker array having a shortest distance to the sound source position of the virtual sound source.

(5)

The signal processing device according to (1) or (2), in which the reference point is a surface that reflects the signal of the virtual sound source.

(6)

The signal processing device according to any one of (1) to (5), in which the signal obtained by making the reverberation sound signal into the virtual sound source is output according to wavefront synthesis filtering processing performed on the reverberation sound signal, the obtained signal having a smaller number of channels than the number of channels of the speaker array.

(7)

The signal processing device according to (6), in which processing of interpolating the signal obtained by making the reverberation sound signal into the virtual sound source is performed, and sound is output from all speaker units included in the speaker array.

(8)

The signal processing device according to (7), in which a signal reproduced from a predetermined speaker included in the speaker array is duplicated to generate a signal reproduced from a speaker adjacent to the predetermined speaker.

(9)

The signal processing device according to any one of (1) to (8), in which a late reverberation sound signal is generated, the generated late reverberation sound signal is converted into a multichannel signal corresponding to the speaker array, and the drive signal is generated by adding the multichannel signal to an output of the wavefront synthesis filter.

(10)

A signal processing method including:

generating, by a reverberation sound signal generation unit, a reverberation sound signal according to a sound source position of a virtual sound source and a distance to a reference point; and generating, by a drive signal generation unit, a drive signal for a speaker array by a wavefront synthesis filter, in which the drive signal generation unit generates the drive signal on the basis of a signal obtained by performing wavefront synthesis filtering processing on a signal obtained by convolving the reverberation sound signal with a signal of the virtual sound source and/or a signal obtained by performing wavefront synthesis filtering processing on the reverberation sound signal to make the reverberation sound signal into a virtual sound source.

(11)

A program for causing a computer to execute a signal processing method including:

generating, by a reverberation sound signal generation unit, a reverberation sound signal according to a sound source position of a virtual sound source and a distance to a reference point; and generating, by a drive signal generation unit, a drive signal for a speaker array by a wavefront synthesis filter, in which the drive signal generation unit generates the drive signal on the basis of a signal obtained by performing wavefront synthesis filtering processing on a signal obtained by convolving the reverberation sound signal with a signal of the virtual sound source and/or a signal obtained by performing wavefront synthesis filtering processing on the reverberation sound signal to make the reverberation sound signal into a virtual sound source.

REFERENCE SIGNS LIST

1, 1A, 1B, 1C Signal processing device
12 Reverberation correction unit
14 Wavefront synthesis filter
15 DA conversion/amplification unit
21 Virtual sound source signal wavefront synthesis filter
22 Virtual reverberation signal generation unit
23 Virtual reverberation signal wavefront synthesis filter
24, 24, 34 Adder
33 Multichannel processing unit
SU Speaker unit
SA Speaker array

The invention claimed is:

1. A signal processing device, comprising:

a reverberation sound signal generation unit configured to generate a reverberation sound signal based on a sound source position of a virtual sound source and a distance to a reference point; and a drive signal generation unit configured to generate a drive signal for a speaker array by a wavefront synthesis filter based on at least one of a first signal obtained by wavefront synthesis filtering processing on a second signal or a third signal obtained by wavefront synthesis filtering processing on the reverberation sound signal to make the reverberation sound signal into the virtual sound source, wherein the second signal is obtained based on convolution of the reverberation sound signal with a fourth signal of the virtual sound source.

2. The signal processing device according to claim 1, wherein the drive signal generation unit is further configured to generate the drive signal based on addition of the third signal and a fifth signal obtained by wavefront synthesis filtering on the fourth signal.

3. The signal processing device according to claim 1, wherein the reference point is a position of a listener with respect to the sound source position of the virtual sound source.

4. The signal processing device according to claim 1, wherein the reference point is a position of the speaker array having a shortest distance to the sound source position of the virtual sound source.

5. The signal processing device according to claim 1, wherein the reference point is a surface that reflects the signal of the virtual sound source.

6. The signal processing device according to claim 1, wherein the third signal is output based on wavefront synthesis filtering processing on the reverberation sound signal, and the third signal has a smaller number of channels than a number of channels of the speaker array.

7. The signal processing device according to claim 6, wherein the speaker array includes a plurality of speaker units to output sound based on interpolation of the third signal.

8. The signal processing device according to claim 7, wherein a sixth signal reproduced from a first speaker of the speaker array is duplicated to generate a seventh signal reproduced from a second speaker of the speaker array, and the second speaker is adjacent to the first speaker.

9. The signal processing device according to claim 1, wherein the reverberation sound signal generation unit is further configured to generate a late reverberation sound signal, the generated late reverberation sound signal is converted into a multichannel signal corresponding to the speaker array, and the drive signal generation unit is further configured to generate the drive signal by addition of the multichannel signal to an output of the wavefront synthesis filter.

10. A signal processing method, comprising:

in a signal processing device:

generating, by a reverberation sound signal generation unit of the signal processing device, a reverberation sound signal based on a sound source position of a virtual sound source and a distance to a reference point; and generating, by a drive signal generation unit of signal processing device, a drive signal for a speaker array by a wavefront synthesis filter based on at least one of a first signal obtained by performing wavefront synthesis filtering processing on a second signal or a third signal obtained by wavefront synthesis filtering processing on the reverberation sound signal to make the reverberation sound signal into the virtual sound source, wherein the second signal is obtained based on convolution of the reverberation sound signal with a fourth signal of the virtual sound source.

11. A non-transitory computer-readable medium having stored thereon, computer-executable instructions which, when executed by a computer, cause the computer to execute operations, the operations comprising:

generating a reverberation sound signal based on a sound source position of a virtual sound source and a distance to a reference point; and generating a drive signal for a speaker array by a wavefront synthesis filter based on at least one of a first signal obtained by wavefront synthesis filtering processing on a second signal or a third signal obtained by wavefront synthesis filtering processing on the reverberation sound signal to make the reverberation sound signal into the virtual sound source, wherein the second signal is obtained based on convolution of the reverberation sound signal with a fourth signal of the virtual sound source.

* * * * *